(12) United States Patent
Yoshida et al.

(10) Patent No.: US 7,083,247 B2
(45) Date of Patent: Aug. 1, 2006

(54) METHOD FOR CORRECTING COLOR DIFFERENCE IN BI-DIRECTIONAL PRINTING, PRINTING APPARATUS, PROGRAM, AND STORING MEDIUM

(75) Inventors: Masakazu Yoshida, Kanagawa (JP); Masanori Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 217 days.

(21) Appl. No.: 10/483,848

(22) PCT Filed: Mar. 13, 2003

(86) PCT No.: PCT/JP03/03031

§ 371 (c)(1),
(2), (4) Date: Jan. 14, 2004

(87) PCT Pub. No.: WO03/078169

PCT Pub. Date: Sep. 25, 2003

(65) Prior Publication Data

US 2004/0174403 A1    Sep. 9, 2004

(30) Foreign Application Priority Data

Mar. 19, 2002 (JP) .............................. 2002-077142
Sep. 13, 2002 (JP) .............................. 2002-267930

(51) Int. Cl.
*B41J 2/205* (2006.01)

(52) U.S. Cl. .......................................... 347/14; 347/19
(58) Field of Classification Search .................. 347/19, 347/14
See application file for complete search history.

(56) References Cited

U.S. PATENT DOCUMENTS 5,359,424 A * 10/1994 Kobayashi ................. 358/296
2003/0025759 A1 * 2/2003 Nagoshi et al. ............... 347/43

FOREIGN PATENT DOCUMENTS

| EP | 955174 A2 * | 11/1999 |
| JP | 62184855 | 8/1987 |
| JP | 03045349 | 2/1991 |
| JP | 06030301 A * | 2/1994 |
| JP | 7029423 | 4/1995 |
| JP | 08281976 | 10/1996 |
| JP | 11320926 | 11/1999 |

* cited by examiner

*Primary Examiner*—Manish S. Shah
*Assistant Examiner*—Laura E. Martin
(74) *Attorney, Agent, or Firm*—Cooper & Dunham LLP

(57) ABSTRACT

A printing apparatus and a method for correcting a difference in a color between a forward printing and a backward printing, by performing gamma correction parameter switching between a gamma correction parameter for the forward printing and a gamma correction parameter for the backward printing. A first chromaticity reproduced by the forward printing, and a second chromaticity reproduced by the backward printing are plotted in a chromaticity space. A correction coefficient is calculated based on a difference in an angle made by a first line and a second line in the chromaticity space. The first line is drawn on a point of the first chromaticity and an origin of axes of the chromaticity space, and the second line is drawn on a point of the second chromaticity and the origin of the axes of the chromaticity space. The first gamma correction parameter for the forward printing is multiplied by the calculated correction parameter so as to create the second gamma correction parameter used in processing image data for the backward printing.

25 Claims, 18 Drawing Sheets

FIG.8A
FIG.8B
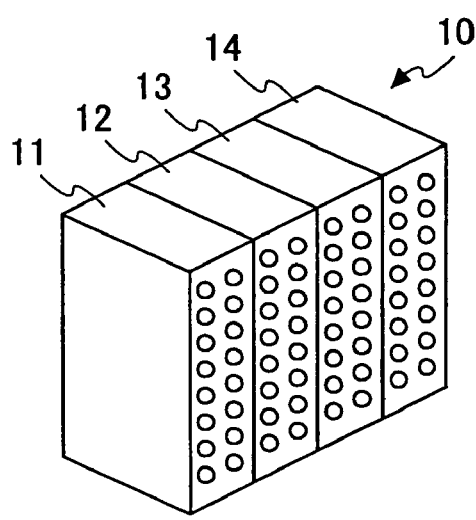
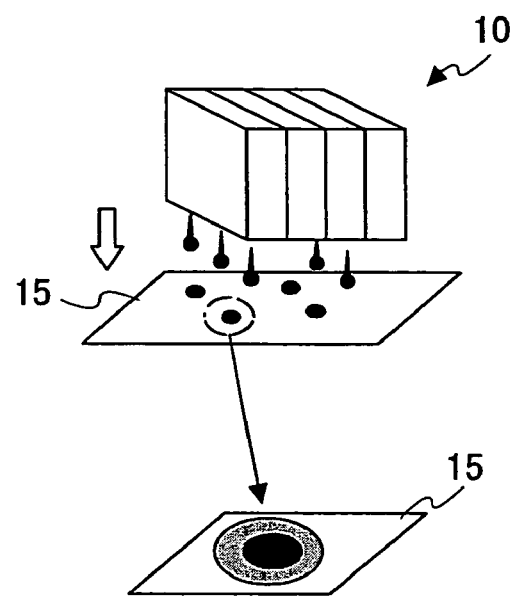

COEFFICIENT $\beta = 1 - \alpha \times \Delta\theta / \theta y$  ($\alpha \geqq 1$)

METHOD FOR CORRECTING COLOR DIFFERENCE IN BI-DIRECTIONAL PRINTING, PRINTING APPARATUS, PROGRAM, AND STORING MEDIUM

TECHNICAL FIELD

The present invention generally relates to an image forming apparatus and an image forming method in which inkjet color printing is employed. Specifically, in an image forming apparatus and an image forming method, an image having high quality can be obtained in bi-directional printing used for printing characters, images, and the like.

The present invention also relates to a method for correcting a color difference in bi-directional printing, a printing apparatus, an inkjet printing apparatus, a program, and a storing medium. Specifically, the present invention relates to a color correction process in digital image processing. For example, in the case of an inkjet printing apparatus that performs printing by ejecting liquid ink on paper, reduction of image quality caused by bi-directional printing can be suppressed.

BACKGROUND ART

A color printing apparatus uses three basic colors of cyan, magenta, and yellow. In inkjet color printing, ink particles of the three basic colors are put on top of one another so as to produce a desired color at a certain region on paper. Further, in the inkjet color printing, brightness or luminosity is also taken into account, and a black color is added to the three basic colors in order to improve appearance of the desired color. The printing that uses these four primary colors takes root. C indicates cyan, M magenta, Y yellow, and K black. CMYK indicates the four basic colors.

One of widely used printing apparatuses is a color printing apparatus that performs bi-directional printing, i.e., performs forward printing by moving a printing head forwards in the direction perpendicular to the direction of sending a printing medium (e.g., paper) and also performs backward printing by moving the printing head backwards in the direction perpendicular to the direction of sending the printing medium. This color printing apparatus improves printing speed and printed resolution. In the bi-directional printing, the head moves forwards to print one line on the printing medium, and the head moves backwards to print another line on the printing medium. In such bi-directional printing, the head need not be moved back to the start position each time one line is printed on the printing medium, so that there is an advantage in that the printing speed is high.

In some cases, a color tone or a hue obtained by the inkjet color printing varies due to the order of printed inks as well as the relative amount of respective inks that are put on the printing medium. For example, the color obtained by the order in which cyan C is first printed, and magenta M is then printed on this cyan C is different from the color obtained by the order in which magenta M is first printed, and cyan C is then printed on this magenta M. The difference of the hue caused by the order of colors adhering to the printing medium becomes a problem in the case of the bi-directional printing method using the printing head having respective inks arranged in a row.

An example of the printing head of the inkjet color printing apparatus is schematically shown in FIG. 1. A printing unit is configured such that black, cyan, magenta, and yellow are arranged in that order toward the forward printing direction in the main running direction as shown in FIG. 1. The arranged order and the number of colors are not limited to this example, and the different arranged order and the different number of colors are used in accordance with ink characteristics, the printing head design, and the like.

In the case of the printing head unit shown in FIG. 1, the inks of K, C, M, and Y are ejected from the printing head in the order of K, C, M, and Y in the forward printing. On the other hand, the inks are ejected in the order of Y, M, C, and K on the printing medium in the backward printing. However, coloring material fixing characteristics affect a color tone. That is, when a second ink is put on a first ink at the same position on a printing medium, the first color ink that first adheres to the printing medium dominates the second color ink that adheres to the first color ink on the printing medium after the first color ink is printed.

FIG. 2 shows the distribution of coloring materials inside the printing medium when two dye type inks are put on the same position on a printing medium. The first ink that is first put on the printing medium spreads in the printing medium more widely than the second ink that is put on the first ink on the printing medium after the first ink is printed. Accordingly, the difference in the fixing region between the coloring materials is generated. As a result, when two color inks (e.g., C and M, or M and Y) are put on the same point on the printing medium, the color ink that is first put so as to adhere to the printing medium is more dominant than the other color that is then put on the first put ink.

FIG. 3 shows the inside (cross section) of the printing medium when two pigment type inks are put on the same point on the printing medium. The first ink that is first put on the printing medium stays at the surface of the printing medium, and the second color that is then put on the first ink on the printing medium sinks inside (beneath the surface of) the printing medium, as shown in FIG. 3. As a result, the first ink that stays at the surface of the printing medium becomes stronger and more dominant than the second ink.

When the bi-directional printing is performed in order to improve a printing speed, it is necessary to take into account the hue change regarding two colors or three colors (e.g., C, M, and Y) put on the same point on the printing medium caused by the coloring material fixing characteristics related to the order in which two or more color inks are put on the same position on the printing medium. Particularly, in the case where the printing medium is greatly moved in the paper sending direction each time one forward printing or backward printing is completed in the main running directions, there is a possibility that the hue change appears as a lateral stripe.

According to "a bi-directional inkjet color printing method" disclosed in Japanese Laid-Open Patent Application No. 11-320926, a printing head used for the forward printing, and a printing head used for the backward printing are employed so that the forward printing and the backward printing can be carried out in the same order of colors. In this method, the difference of the hue is suppressed, but manufacturing costs of the printing heads increase.

According to "a printing method in a forward and backward printing printer" disclosed in Japanese Published Patent Application No. 7-29423, in the printing operation, printing lines printed by the forward printing and printing lines printed by the backward printing are alternately arranged. In this method, the difference of the hue is suppressed by using the trick of the human eyesight, but when a printing job is done, the head always needs to be moved forwards and backwards, alternately. Accordingly, uni-directional printing cannot be performed, so that it is difficult to print an image of high quality that has no difference in the hue caused by the difference of the order of colors.

According to "a bi-directional color printing method in a liquid ink printer" disclosed in Japanese Laid-Open Patent Application No. 8-281976, a lookup table for the forward printing, and a lookup table for the backward printing are used to suppress the difference of the hue. However, a color calibration test sheet needs to be printed out in both the forward printing and the backward printing, the printed result on the color calibration test sheet needs to be measured by a scanner, a spectrophotometer, or a densitometer, and a color space conversion lookup table needs to be created. Furthermore, another lookup table becomes necessary each time a printing medium is changed. Accordingly, a burden on a user of the printer becomes large.

Furthermore, since an inkjet printing apparatus is cheap, and can produce an image having high quality by using specific paper, the inkjet printing apparatus is rapidly and widely used by individuals. In addition, recently, the inkjet printing apparatus as a printer capable of performing color printing took root in offices where electrophographic laser printers are mainly used. In order to further spread the inkjet printing apparatuses in offices, the two following big problems need to be solved.

First, the inkjet printing apparatus needs to use standard paper. In the case of using special paper, the inkjet printing apparatus can reproduce an image having very high quality. In recent years, the inkjet printing apparatus for use by individuals has become able to print an image of so high quality that one can take it for a photograph. However, the special paper that the inkjet printing apparatus uses for high quality printing is generally expensive, and it is difficult to introduce such an inkjet printing apparatus to companies that require strict cost management. Further, demerits are larger than advantages when the inkjet printing apparatus that can use only the special paper is used in the offices where high quality image characteristics are not frequently required.

The composition of ink has been improved in order to apply the standard paper to the inkjet printing apparatus. For example, development of dye type ink having low penetration in paper, use of a fixing assist agent, and development of pigment type ink have been tried. As a result, even when using the standard paper generally used in the offices such as copy paper, the recent inkjet printing apparatus can perform printing having the quality that is not inferior to the quality achieved by the laser printer.

The second problem is a printing speed. Except for a particular type inkjet printing apparatus such as an industrially used inkjet printing apparatus, when the inkjet printing apparatus performs printing, the printing head that is much smaller than the paper moves on the paper many times, and ejects ink on the paper. In this printing method, the printing is performed line by line. Compared with the electrophotographic printing method in which printing is performed page by page, i.e., surface by surface, the printing method by the inkjet printing apparatus is substantially disadvantageous in terms of the printing speed. In order to solve the disadvantage of the printing speed in the inkjet printing apparatus, a period of ejecting ink was shortened to improve speed of the printing head, the printing head was made large to decrease the number of the movements of the printing head, bi-directional printing was performed to decrease the number of the movements of the printing head, or a running sequence of the printing head was made more efficient or optimized to move the printing head to only the positions where the image data are printed. Accordingly, some of the most recent inkjet printing apparatuses can print the small-to-medium number of pages at a speed substantially equal to or higher than a speed of the electrophotographic printing method.

These improvements in the image quality and the printing speed made the inkjet printing apparatus more popular even in the offices. Particularly, the inkjet printing apparatus is more advantageous than the laser printer in terms of a cost, and the size of the inkjet printing apparatus is easily made small to promote the desktop usage of the inkjet printing apparatus.

In the printing by the laser printer or offset printing, coloring materials are fixed at the paper surface. However, in the printing by the inkjet printing apparatus, coloring materials are fixed after the coloring materials penetrate in the paper. The problem and the condition related to the ink penetration in the paper always accompany the printing by the inkjet printing apparatus.

In the printing performed by the inkjet printing apparatus, there is also the following problem. Water contained in the ink causes the paper to expand and be wet, and there is a case where the deformed paper contacts with the printing head, ink on the paper adheres to the printing head by this contact, and this ink adhering to the printing head is transferred to the paper (the secondary transfer occurs), resulting in the degraded image printed on the paper. It is desired to reduce a gap between the printing head and the paper as much as possible in order to raise the accuracy in the position where ink is ejected on the paper, but the standard paper used in the office is not suitable for the printing that causes the paper to expand and be wet. Accordingly, when the gap between the printing head and the paper is strictly made small, there is a possibility that the inkjet printing apparatus cannot perform printing on the standard paper without generating problems. Usually, there is a time lag between the time the ink adheres on the paper and the time the paper starts to expand. Furthermore, in offices, the printing speed often has priority over the image quality. Accordingly, as in the use in the offices, with the image quality being sacrificed to a certain degree, this problem can be neglected while the printing speed is raised.

Furthermore, as described above, in the bi-directional printing by the inkjet printing apparatus, a hue produced by the forward printing becomes different from a hue produced by the backward printing because a first color ink that is first printed on paper contributes to a hue larger than another color ink that is then printed on the paper at the same position of the first color ink, and the printing order of the color inks in the forward printing are reversed in the backward printing. Accordingly, a hue generated in a band or line printed in the forward printing becomes different from the generated hue in a band or line printed in the backward printing, generating a printed image appearing to be covered with light lateral stripes. However, this problem does not lead to the unacceptable image quality generated in the secondary transfer process. Furthermore, this problem is generated in the high speed printing in which a certain degree of the degradation of image quality can be accepted. For this reason, this problem has not been actively dealt with except for some cases.

According to a method disclosed in Japanese Laid-Open Patent Application No. 11-320926, two printing units are used. The order of colors arranged in one of the printing head units is opposite to the order of colors arranged in the other of the printing head units. One-dot line forward printing by the one of the printing head unit and one dot-line backward printing by the other of the printing head units are formed alternately on a print medium. In this manner, the color difference between the forward printing and the backward printing can be suppressed.

However, in this method, two subsystems for maintaining and recovering functions of the two printing head units are required, resulting in a high cost. Working for cleaning head units becomes two times larger, and a possibility exists that inks are mixed with one another via a wiping blade that cleans nozzle surfaces.

According to a method disclosed in Japanese Published Patent Application No. 7-29423, the forward printing is performed at intervals of every other dot, and the backward printing is performed so as to print the dots that are not printed in the forward printing.

However, in this method, two printing processes, i.e., the forward printing and the backward printing are performed on the same dot line, so that the printing speed does not become higher than the printing speed in the uni-directional printing.

DISCLOSURE OF THE INVENTION

It is an object of the present invention to reduce a difference in a color or a hue between the forward printing and the backward printing, by image processing.

It is another object of the present invention to provide an image forming apparatus (e.g., a printing apparatus) of a low cost, and an image forming method in which high speed printing can be performed so as to produce an image with a desired quality.

It is another object of the present invention to provide a method for correcting a difference in a color caused by the bi-directional printing, a printing apparatus, an inkjet printing apparatus, a program, and a storing medium by which the difference in a color between the forward printing and the backward printing can be easily and effectively corrected. Specifically, gamma correction parameter switching is performed between a gamma correction parameter for the forward printing and a gamma correction parameter for the backward printing in an image processing sequence so as to minimize a difference in a color between the forward printing and the backward printing.

According to a first aspect of the present invention, there is provided an image forming apparatus including a printing head that performs forward printing with inkjet color inks in a forward direction and backward printing with inkjet color inks in a backward direction, comprising a gamma correction unit that uses a first gamma correction value for forward-printing image data and a second gamma correction value for backward-printing image data to reduce a difference in a color between the forward printing and the backward printing that is caused by a difference of printing order of the color inks between the forward printing and the backward printing.

According to a second aspect of the present invention, there is provided a method for forming an image by using inkjet color inks in which forward printing is performed by moving a printing head forwards, and backward printing is performed by moving the printing head backwards, comprising the step of using a first gamma correction value for forward-printing image data and a second gamma correction value for backward-printing image data to reduce a difference in a color between the forward printing and the backward printing that is caused by a difference of printing order of the color inks between the forward printing and the backward printing.

Furthermore, it is possible to correct the hue difference that is caused by putting respective inks on top of one another at the same position or the same region on the print medium in the bi-directional printing. The hue change data at the time of the backward printing may be created based on the hue produced by the forward printing, and the hue correction table may be prepared in advance. Then, a luminosity and a color saturation of input image data may be adjusted by using the hue correction table at the time of the backward printing, that is, the gamma correction may be performed. In this manner, it is possible to reduce the hue difference between the forward printing and the backward printing.

According to a third aspect of the present invention, there is provided a method for correcting a color difference between forward printing and backward printing performed by a printing apparatus, comprising the steps of:

creating a first gamma correction parameter for forward-printing image data, and a second gamma correction parameter for backward-printing image data so as to minimize the color difference between the forward printing and the backward printing, and performing gamma correction parameter switching so as to select one of the first gamma correction parameter and the second gamma correction parameter in accordance with the forward printing and the backward printing.

According to a fourth aspect of the present invention, there is provided a printing apparatus that performs forward-ing printing and backward printing, comprising:

a head unit for printing an image;

storing means for storing a first gamma correction parameter for forward-printing image data, and a second gamma correction parameter for backward-printing image data so as to minimize a difference in a color between the forward printing and the backward printing; and correction means for performing gamma correction parameter switching so as to select one of the first gamma correction parameter and the second gamma correction parameter in accordance with the forward printing and the backward printing.

According to a fifth aspect of the present invention, there is provided a program to be executed by a computer so as to perform a method for correcting a color difference between forward printing and backward printing performed by a printing apparatus, the method comprising the steps of:

creating a first gamma correction parameter for forward-printing image data, and a second gamma correction parameter for backward-printing image data so as to minimize the color difference between the forward printing and the backward printing, and performing gamma correction parameter switching so as to select one of the first gamma correction parameter and the second gamma correction parameter in accordance with the forward printing and the backward printing.

According to a sixth aspect of the present invention, there is provided a program to be executed by a computer so that a printing apparatus performs forward printing and/or backward printing so as to correct a difference in a color between the backward printing and the forward printing, the printing apparatus comprising:

a head unit for printing an image;

storing means for storing a first gamma correction parameter for forward-printing image data, and a second gamma correction parameter for backward-printing image data so as to minimize a difference in a color between the forward printing and the backward printing; and correction mean for performing gamma correction parameter switching so as to select one of the first gamma correction parameter and the second gamma correction parameter in accordance with the forward printing and the backward printing.

According to a seventh aspect of the present invention, there is provided a computer-readable storing medium that stores the program of the fifth aspect or the sixth aspect of the present invention.

BRIEF DESCRIPTION OF THE DRAWINGS

FIGS. 8A and 8B show one example of a head unit of the inkjet printing apparatus shown in FIG. 7.

BEST MODE FOR CARRYING OUT THE INVENTION

Figure 1:
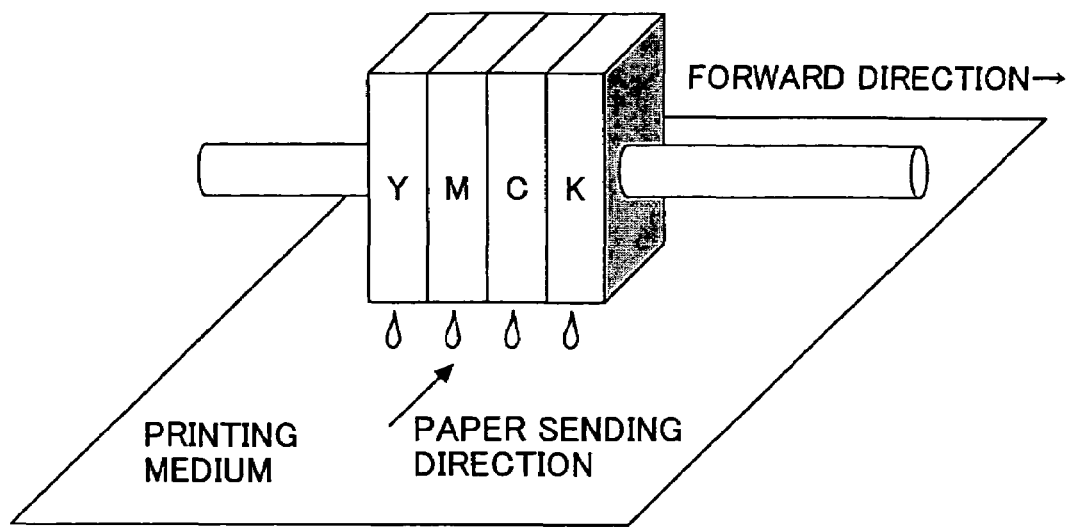
FIG. 1 is a schematic view showing a print head of an inkjet color printing apparatus in the related art.
Figure 2:
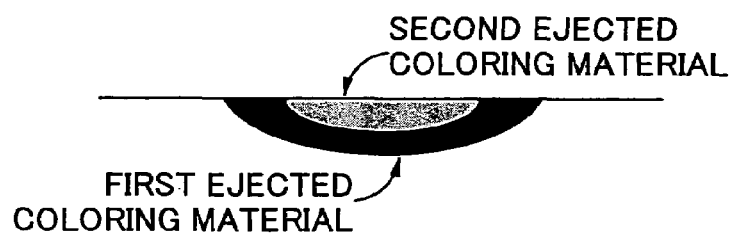
FIG. 2 shows a coloring material distribution in the inside of paper when two pigment type inks are ejected at the same position on the paper.
Figure 3:
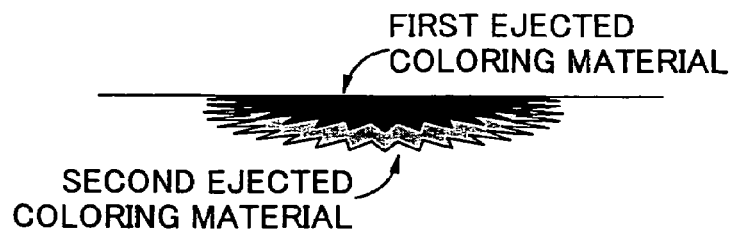
FIG. 3 shows a coloring material distribution in the inside of paper when two dye type inks are ejected at the same position on the paper.
Figure 4:
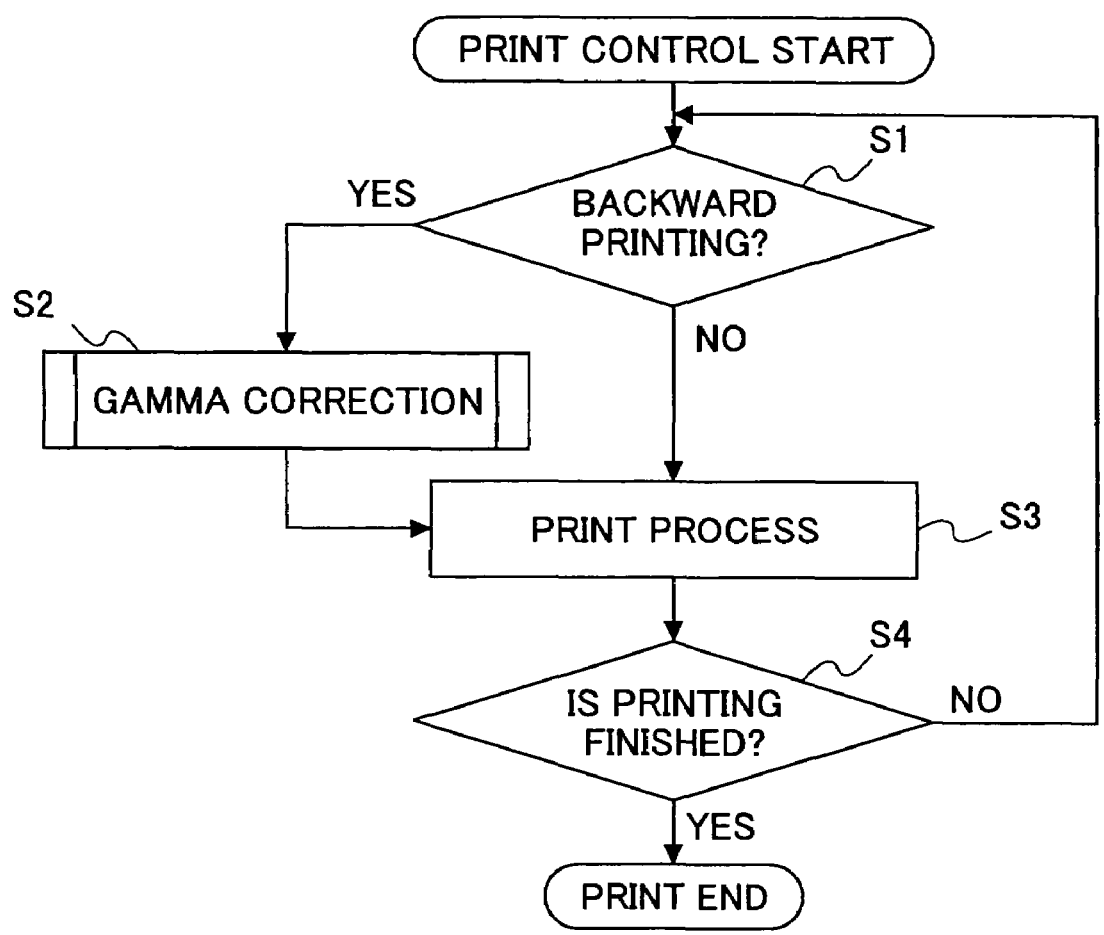
FIG. 4 is a flow chart showing printing control of an inkjet color printing apparatus that performs a forward printing and a backward printing according to a first embodiment of the present invention.

A first embodiment of a bi-directional color printing method according to the present invention will be described. FIG. 4 is a flow chart of printing control in the bi-directional inkjet color printing according to the first embodiment.

When a printing head moves forwards on a printing medium (NO in step S1), a normal printing process is carried out in step S3. On the other hand, when the printing head moves backwards on the printing medium (YES in step S1), image processing is carried out on input image data by performing gamma correction, using a hue correction table that has been created in advance, in step S2. After step S2, a printing process is carried out in step S3. After step S3, it is determined in step S4 whether or not the printing process is finished. When it is determined in step S4 that the printing process is not finished, the procedure returns to step S1. Meanwhile, when it is determined in step S4 that the printing process is finished, the printing is complete.

In other words, the bi-directional printing is a special printing method for improving a printing speed, and in usual cases, the uni-directional printing in which the printing is carried out by only the forward movement of the printing head is performed. Accordingly, when the backward printing is carried out, the gamma correction value that is adjusted based on the gamma correction value of the forward printing is used to correct the difference in the hue between the forward printing and the backward printing.

Figure 5:
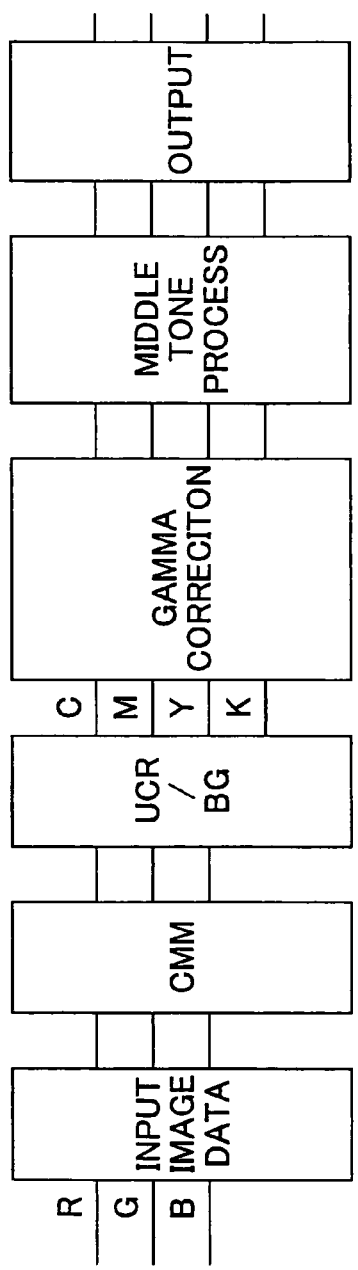
FIG. 5 shows a timing for applying gamma correction in image processing.

This gamma correction printing is repeatedly performed until all of input image data is processed. In this manner, it is possible to perform the printing process in which the difference in the hue between the printed line of the forward printing and the printed line of the backward printing is small. FIG. 5 shows the timing for applying the gamma correction in the image processing.

Figure 6:
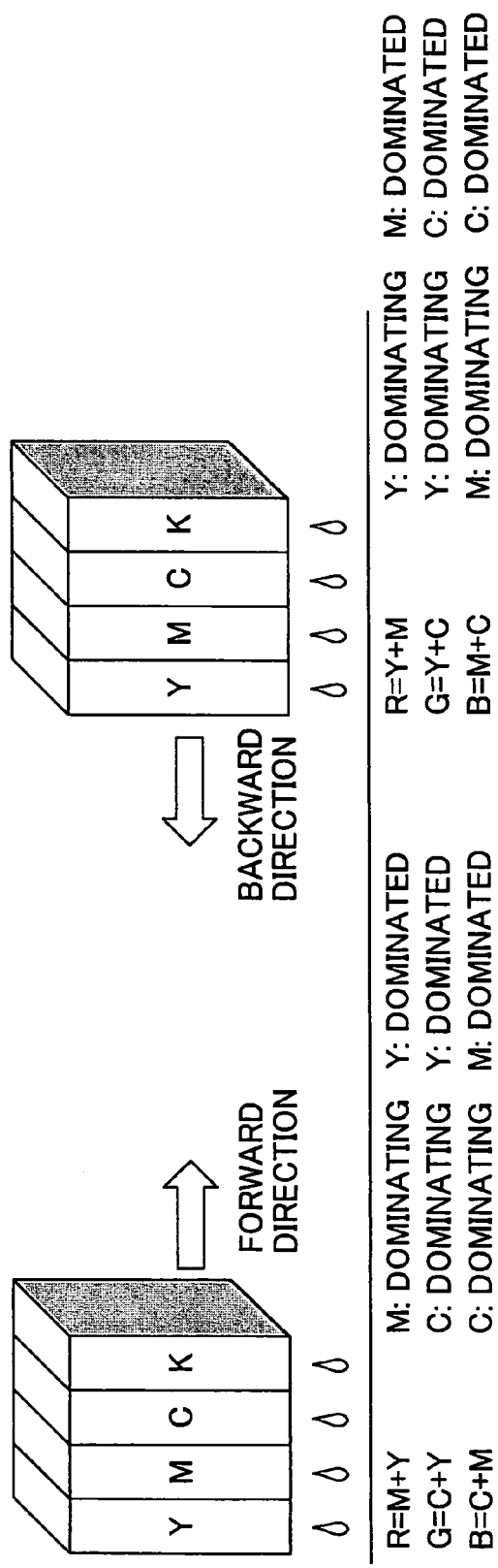
FIG. 6 shows dominating/dominated relation when two different inks are printed at the same position on paper.

FIG. 6 shows dominating/dominated relation of two colors that are put at the same point on the printing medium. The dominating/dominated relation of the two colors is reversed when the printing direction is changed from the forward direction to the backward direction. The gamma correction value used in processing image data for the forward printing is made to be a standard. Accordingly, in the case of producing a certain hue by the bi-directional printing, when the intended color is changed to the dominating color from the dominated color in the backward printing (that is, this color is changed to be first printed on the printing medium), the increased contribution to this hue by the dominating/dominated change of this color is reflected on the gamma correction value of this color used in processing image data for the backward printing, and when the intended color is changed to the dominated color in the backward printing (that is, this color is changed to be printed on the other color on the printing medium after the other color is printed), the decreased contribution to this hue by the dominating/dominated change of this color is reflected on the gamma correction value of this color. When only a single color ink is printed at a certain region on the printing medium, there is no difference in the hue between the forward printing and the backward printing, so that such a single color ink to be printed on the printing medium without being affected by other color inks is desirably not corrected with respect to the forward and backward printing.

The gamma correction values $RevC\gamma$, $RevM\gamma$, $RevY\gamma$, and $RevK\gamma$ used in processing image data for the backward printing (the reverse direction printing) in this embodiment are shown in the equation 1:

$$RevC\gamma = C\gamma - Ddw \times Kin + Dup \times Min + Dup \times Yin$$

$$RevM\gamma = M\gamma - Ddw \times Kin - Dup \times Cin + Dup \times Yin$$

$$RevY\gamma = Y\gamma - Ddw \times Kin - Dup \times Cin - Dup \times Min$$

$$RevK\gamma = K\gamma + Ddw \times Cin + Dup \times Min + Dup \times Yin.$$

In the equation 1, $C\gamma$ through $K\gamma$ indicate the gamma correction values used in processing image data for the forward printing and corresponding to the respective colors C through K, and $RevC\gamma$ through $RevK\gamma$ indicate the gamma correction values used in processing image data for the backward printing and corresponding to the respective colors C through K. Cin through Kin are flags that become "1" when the corresponding color is to be printed at the same intended position on the printing paper, and the flags of Cin through Kin become "0" when the corresponding color is not to be printed at the intended same position on the printing medium. Dup of the color that is multiplied by this Dup in the equation 1 is a coefficient whose value corresponds to the increased contribution to the hue produced when the colors are printed at the same position on the printing medium, and Ddw of the color that is multiplied by this Ddw in the equation 1 is a coefficient whose value corresponds to the decreased contribution to the hue produced when the colors are printed at the same position on the printing medium. The equation 1 shows the case where the color order arranged in the printing head unit is the order of K, C, M, and Y toward the forward direction as shown in FIG. 6. When the color order and/or the number of colors are different from the case shown in FIG. 6, another equation is prepared on the model of the equation 1.

According to this embodiment, when the printing is carried out in the backward direction, the gamma correction values are switched to the gamma correction values for the backward printing. In other words, when two or more colors are printed at the same position on the printing medium in the backward printing, the gamma correction values on which the increased or decreased contributions to the hue by the intended colors are reflected are used. Furthermore, when only a single color is printed at a position on the printing medium, the gamma correction value for the forward printing is used both at the time the forward printing is carried out and at the time the backward printing is carried out. Accordingly, in this embodiment, when the bi-directional printing is performed, it is possible to obtain color reproduction having the same quality as that obtained by the uni-directional printing.

Figure 7:
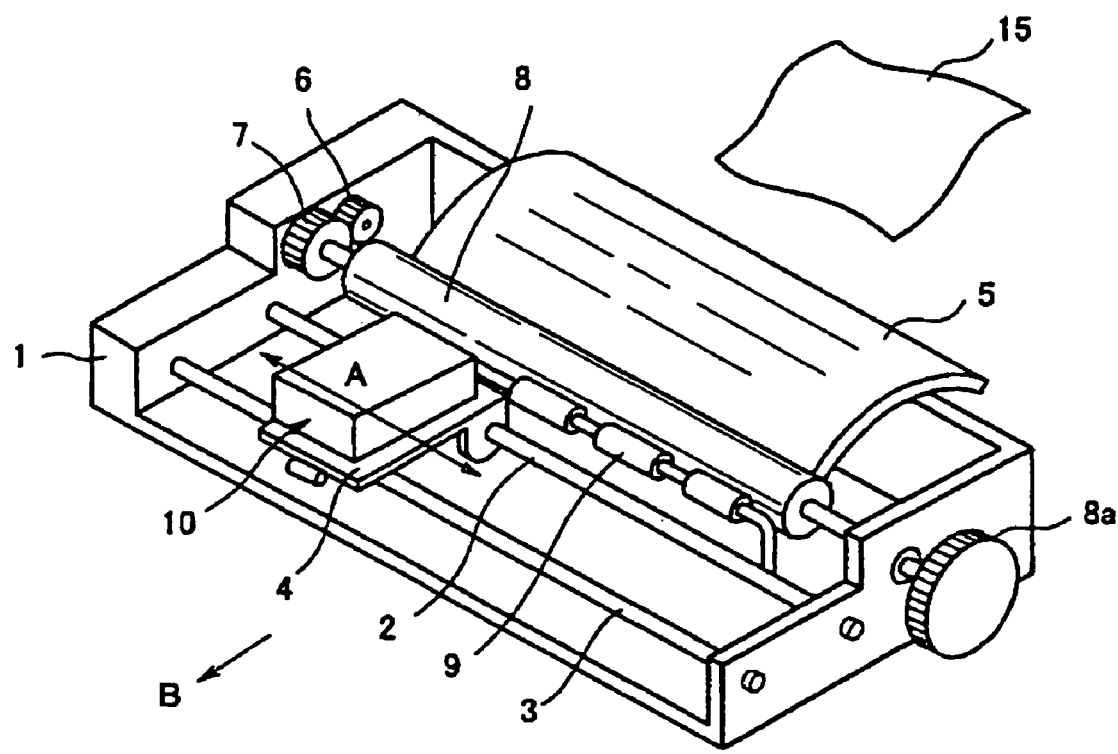
FIG. 7 is a perspective view showing a mechanism of an inkjet printing apparatus according to a second embodiment of the present invention.

An inkjet printing apparatus of a second embodiment according to the present invention is shown in FIG. 7. In FIG. 7, the reference number 1 designates a frame, 2 and 3 guide rails, 4 a carriage, 5 a guide plate, 6 a driving gear, 7 a sprocket gear, 8 a platen, 8a a sending knob, 9 a pressure roller, 10 a head unit, and 15 print paper. In this inkjet printing apparatus, both ends of the guide rails 2 and 3 are supported by the frame 1 with the guide rails 2 and 3 being laid, and the carriage 4 is mounted on the guide rails 2 and 3 so as to move along the guide rails 2 and 3 relative to the guide rails 2 and 3. A driving source such as a motor (not shown) may move the carriage 4 having the head unit 10 in the directions indicated by the arrow A of FIG. 7. The platen 8 that has the sending knob 8a and may be rotated by a driving source (not shown) via the driving gear 6 and the sprocket gear 7 takes in the print paper 15 placed on the guide plate 5. The print paper fed by the platen 8 can be sent in the direction indicated by the arrow B of FIG. 7 in rolling contact between the circumferential surface of the platen 8 and the pressure roller 9 opposing this surface of the platen 8.

When the head unit 10 of this inkjet printing apparatus ejects ink to print an image on the print paper 15, the print paper 15 is sent in the sub-running direction (i.e., the direction indicated by the arrow B) while the head unit 10 is moved in the main running directions (i.e., the directions indicated by the arrow A).

The head unit 10 mounted on the carriage 4 of the inkjet printing apparatus of FIG. 7 is shown in FIGS. 8A and 8B. The head unit 10 includes ejection units 11, 12, 13, and 14 corresponding to respective colors. Generally, the head unit 10 integrally formed with the ejection units 11 through 14 ejects ink to perform printing. Each of these ejection units 11 through 14 has a plurality of ejection nozzles as shown in FIG. 8A. In FIG. 8B, an ink drop ejected from the head unit 10 is placed on the print paper 15.

Figure 9:
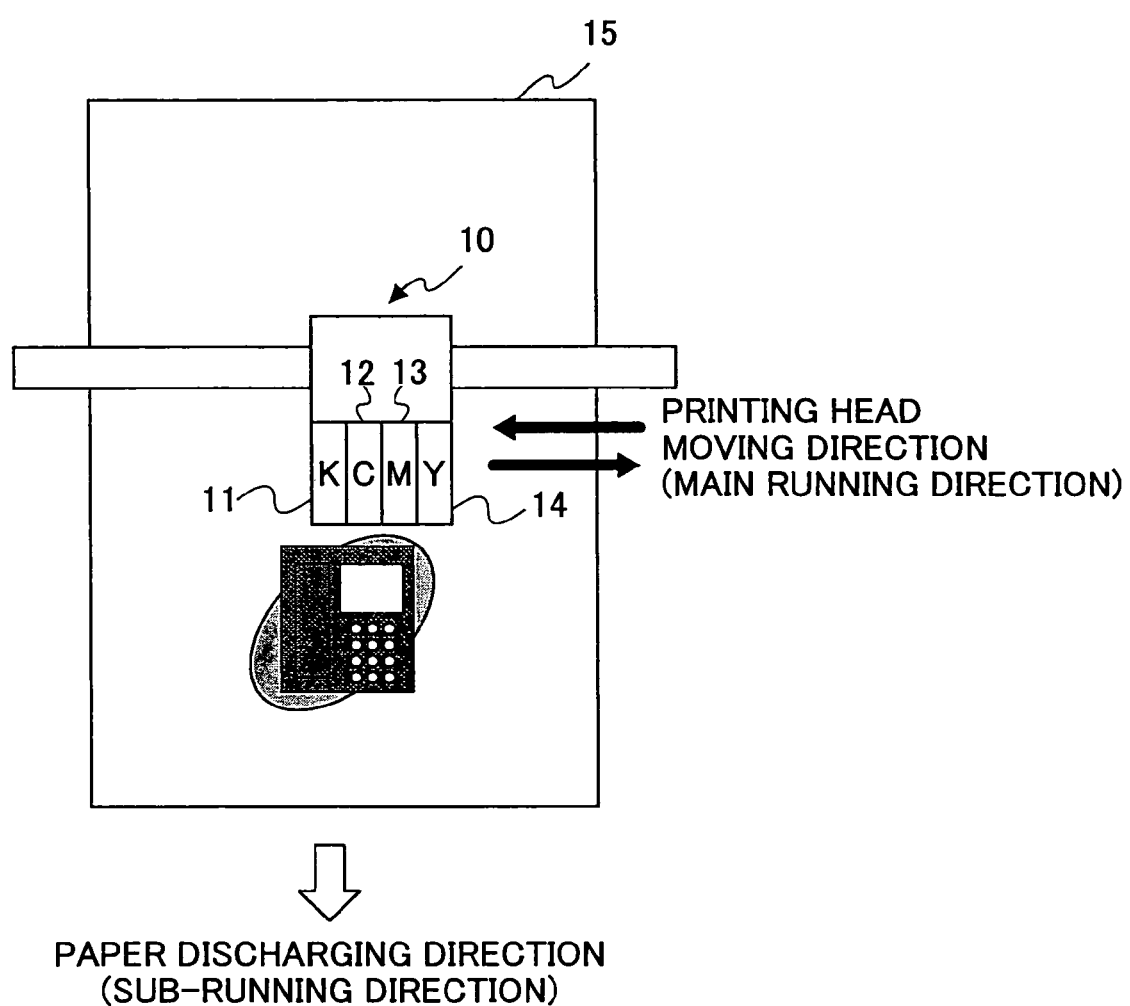
FIG. 9 shows an operation of the head unit of FIGS. 8A and 8B at the time of performing a bidirectional printing on paper.

An example of an operation of the head unit 10 at the time of the bi-directional printing on the print paper 15 is shown in FIG. 9. In this example, the ejection units 11 through 14 are configured such that black K, cyan C, magenta M, and yellow Y are arranged in that order toward the forward direction in the main running direction as shown in FIG. 9 (in this example, the left direction of FIG. 9 is the forward direction). However, the order and the number of colors are not limited to this example, and the different order and the different number of colors may be used in the head unit.

In this example of the head unit 10 shown in FIG. 9, at the time of the printing in the forward direction (i.e., at the time of the forward printing), the color inks are ejected to the same position on the print paper 15 from the head unit 10 in the color order of K, C, M, and Y. At the time of the printing in the backward direction (the right direction of FIG. 9), the color inks are ejected to the same position on the print paper 15 from the head unit 10 in the color order of Y, M, C, and K that is the reverse printing color order of the forward printing. As described above, due to the coloring material fixing characteristics, when different color inks are ejected to the same position, the contribution to the hue by the color ink that is first ejected to this position is larger than the contribution by the color ink that is later ejected.

Figure 10:
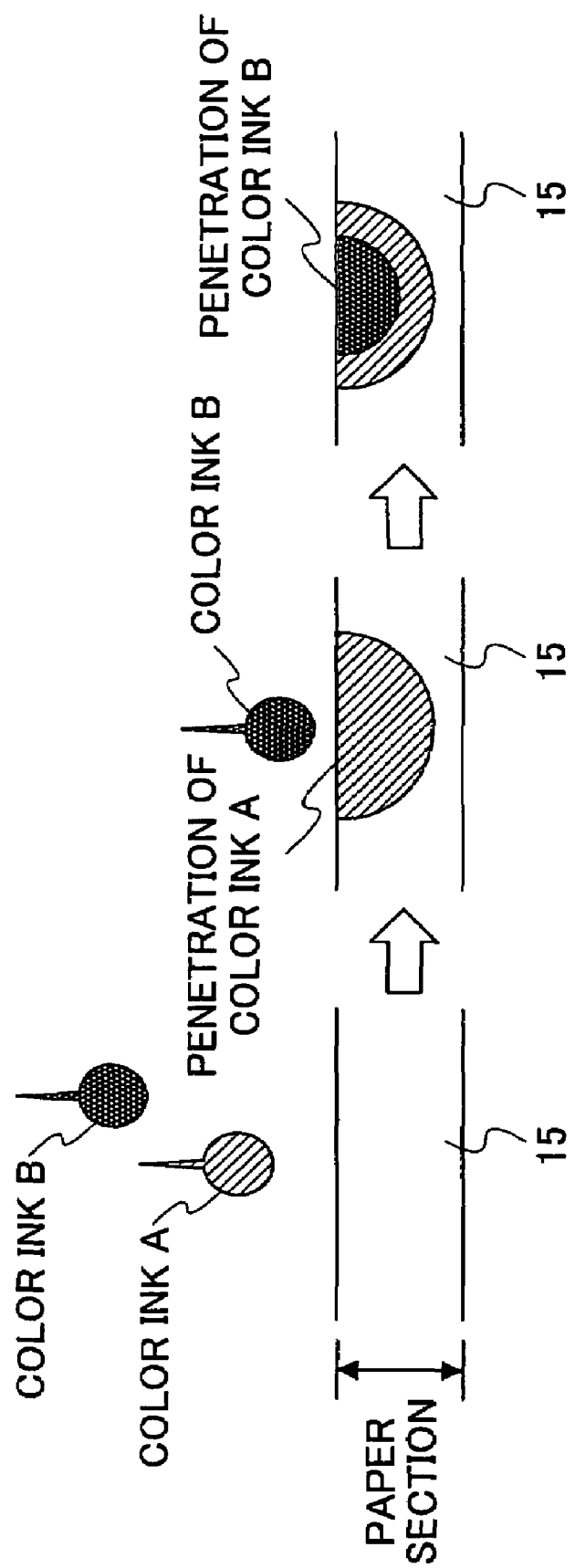
FIG. 10 is a sectional view of print paper showing a coloring material distribution when two drops of dye type ink are ejected at the same position on paper.

FIG. 10 is a sectional view showing an example of coloring material distribution in the print paper 15 when two dye type color inks are ejected to the same position on the print paper 15. As shown in FIG. 10, the color ink A that is first ejected to the print paper 15 spreads in the print paper 15 more widely than the color ink B that is later ejected to the print paper 15. Accordingly, the fixing range of the ink A becomes different from the fixing range of the ink B. In other words, the fixing range of the ink A is larger than that of the ink B. As a result, when two color inks A and B (e.g., C and M, or M and Y) are ejected to the same position on the print paper 15, the contribution to the hue by the ink A is larger than the contribution to the hue by the ink B.

Figure 11:
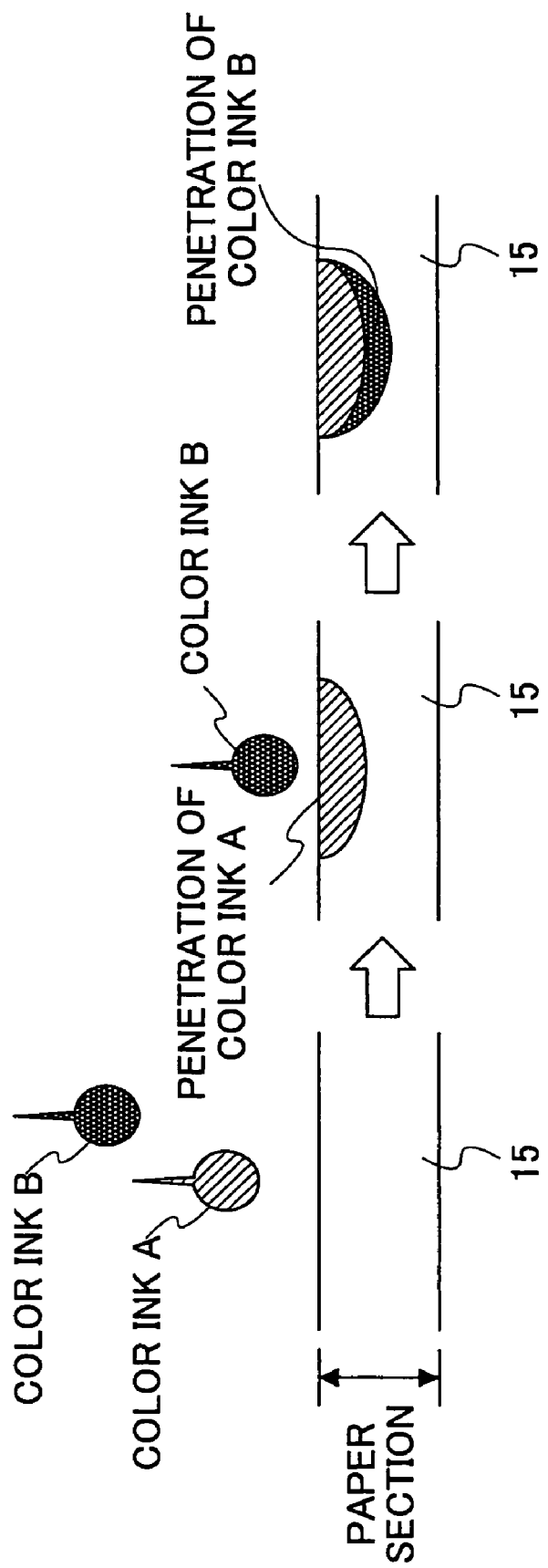
FIG. 11 is a sectional view of paper showing a coloring material distribution when two drops of pigment type ink are ejected at the same position on paper.

FIG. 11 is a sectional view showing an example of coloring material distribution in the print paper 15 when pigment type color inks are ejected to the same position on the print paper 15. The color ink A that is first ejected to the print paper 15 stays at (closer to) the surface of the print paper 15, and the color ink B that is later ejected to the print paper 15 sinks inside (further into) the print paper 15. As a result, due to the coloring material fixing characteristics, the contribution to the hue by the color ink A that stays at the surface of the print paper 15 is larger than the contribution by the color ink B. There is a tendency that the hue contribution characteristics in the pigment type color inks are more visible than the hue contribution characteristics in the dye type color inks.

Accordingly, in the case of the bi-directional printing, while a printing speed improvement is taken into account, it is also necessary to take into account the hue contribution change when two color inks (e.g., C and M, or M and Y), or three color inks (e.g., C, M and Y) are ejected to the same position on the print paper 15. As described above, particularly, in the case where the print paper 15 is greatly moved each time the forward printing or the backward printing is performed, there is a possibility that the difference in the color (the color may include the hue, the chromaticity, the luminosity, the print density, and the like) between the forward printing and the backward printing appears as a lateral stripe.

Figure 12:
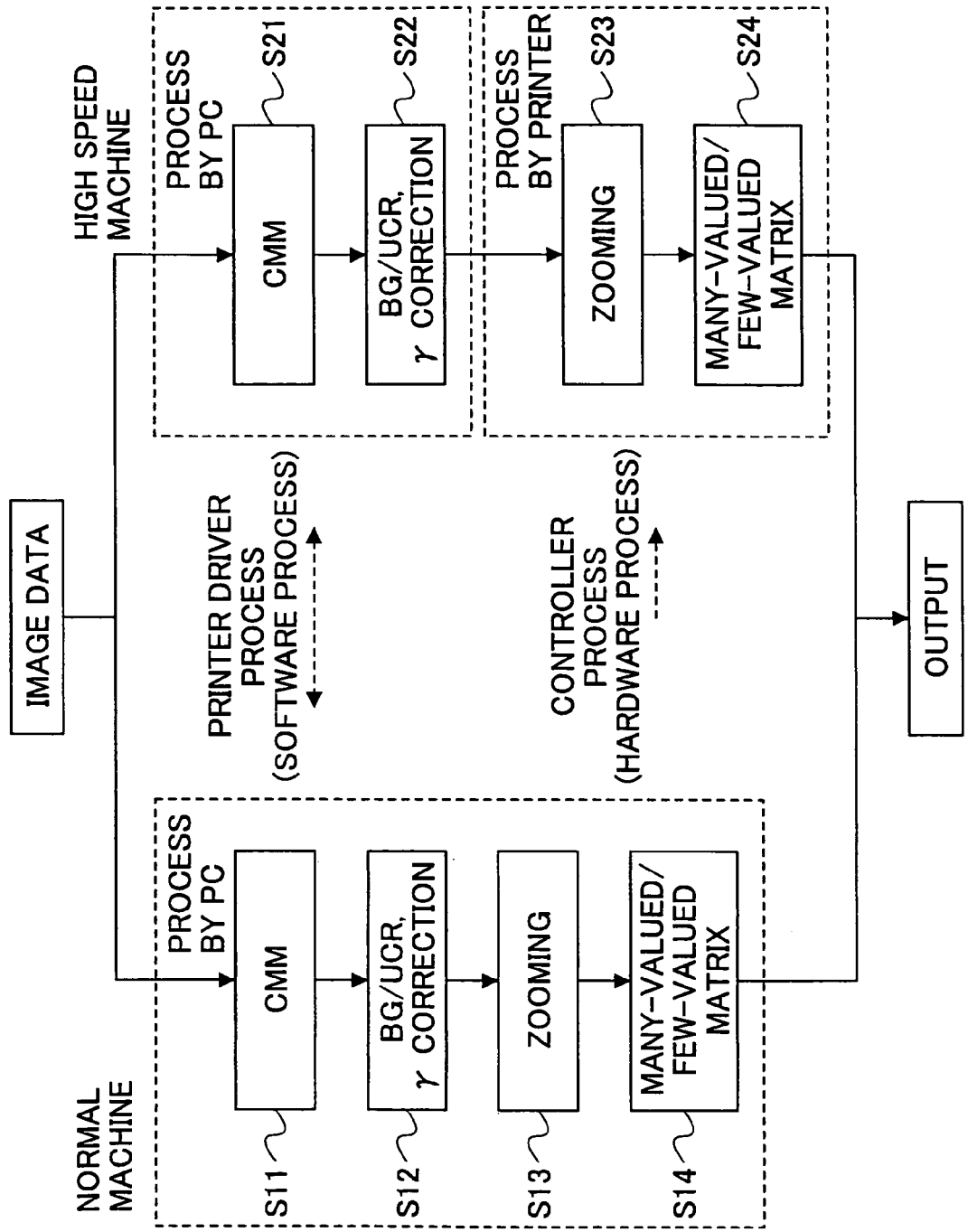
FIG. 12 shows a timing of an image process performed by using a gamma parameter according to the second embodiment of the present invention.

An example of a timing or a position for performing an image processing by using gamma correction parameters according to the second embodiment of the present invention is shown in FIG. 12. In this example, there are two processing patterns. In a first processing pattern, almost all of image processes are performed by a personal computer PC. In a second processing pattern, the PC performs a part of the image processes, and the printer performs the remaining image processes. According to the present invention, the color difference correction processing can be performed in either the first processing pattern or the second processing pattern. In the first processing pattern, the PC uses a printer driver, and performs a part of image processes by software. That is, in the first processing pattern, the PC performs a CMM process in step S11, and performs a BG/UCR process and a gamma correction process in step S12. Next, the PC performs a series of image processes. For example, the PC performs a zooming process in step S13, and performs a many-valued/few-valued matrix process in step S14. On the other hand, in the second processing pattern, first, the PC uses a printer driver, and performs the image processing by software. That is, the PC performs a CMM process in step S21, and performs a BG/UCR process and a gamma correction process in step S22. Thereafter, the printer performs a series of image processes. For example, the printer performs hardware processing by a controller, that is, performs a zooming process in step S23, and performs a many-valued/few-valued matrix process in step S24.

In the PC, a printing command is generated from application software executed by the PC, image data is processed by using the printer driver incorporated as software in the PC to form raster data that are dot pattern data. After that, the raster data is sent to the inkjet printing apparatus, and the inkjet printing apparatus performs printing based on the received raster data. In the case where the inkjet printing apparatus performs the image processes, the gamma correction parameters used for performing the gamma correction are stored in a memory such as a ROM of the inkjet printing apparatus. In the case where the gamma correction is performed by the printer driver of the PC, the gamma correction parameters are stored in a storing device such as a hard disk in the PC. According to the second embodiment, the PC having the incorporated printer driver includes storing means such as a hard disk for storing the gamma correction parameters used in processing image data for the forward printing, and the gamma correction parameters used in processing image data for the backward printing. The gamma correction parameters for the forward printing are different from the gamma correction parameters for the backward printing such that the color difference caused by the bi-directional printing is minimized. The creation of the gamma correction parameters will be described later. The printer driver incorporated in the PC has a correction function of switching the gamma correction parameters used for processing image data sent to the head unit 10. This gamma correction parameter switching is performed by switching the gamma correction parameters stored in the storing means in accordance with the forward printing and the backward printing. A printing apparatus such as the inkjet printing apparatus may have this correction function of switching the gamma correction parameters. The gamma correction parameter used in processing image data for the forward printing or the backward printing is also referred to as the gamma correction parameter (used) for the forward printing or the backward printing.

In the second embodiment, the switching of the gamma correction parameters is performed such that at the time of the forward printing, the gamma correction parameters for the forward printing are used, and at the time of the backward printing, the gamma correction parameters for the backward printing are used. By performing the switching of the gamma correction parameters, the difference in the contribution to the hue as shown in FIGS. 10 and 11 can be suppressed. The bi-directional printing method is a special printing method for improving the printing speed, and in usual cases, the uni-directional printing method in which only the forward printing is performed is mainly performed. For this reason, the gamma correction parameters used in processing image data for the forward printing are standard parameters. When the backward printing is performed, the gamma correction parameters for the backward printing that are adjusted based on the gamma correction parameters for the forward printing are used. In this manner, the difference in the contribution to the hue or the color tone is corrected.

The use of the gamma correction parameters is advantageous in that the cost is not much needed, and the creation and adjustment of the parameters can be made easily. A CMM table can be also used to suppress the color difference, but a special environment is required for creating the CMM table, and the creation of the CMM table takes a great deal of time. In addition, there is not flexibility at the stage of the CMM table development, and after a user obtains the CMM table as a product, it is difficult for the user himself or herself to adjust the CMM table. Meanwhile, in the case of the gamma correction parameters, the user can easily create and adjust the gamma correction parameters.

According to the second embodiment, when the bi-directional printing is carried out, the switching of the gamma correction parameters is performed, so that the color correction processing becomes simple. In addition, it is easy to create and adjust the gamma correction parameters, so that the workload for the development of the gamma correction parameters is small, and even the user who does not have a special tool can easily adjust the gamma correction parameters. Furthermore, the gamma correction parameters used in processing image data for the forward printing are set to be the same as those used in processing image data for the usual uni-directional printing, and when the backward printing is performed in the bi-directional printing, the gamma correction parameters for the backward printing that are adjusted based on the gamma correction parameters for the forward printing are used. In this manner, it is possible to suppress the difference in the color (the hue or the chromaticity) between the bi-directional printing and the uni-directional printing that is a normal printing mode.

Figure 13:
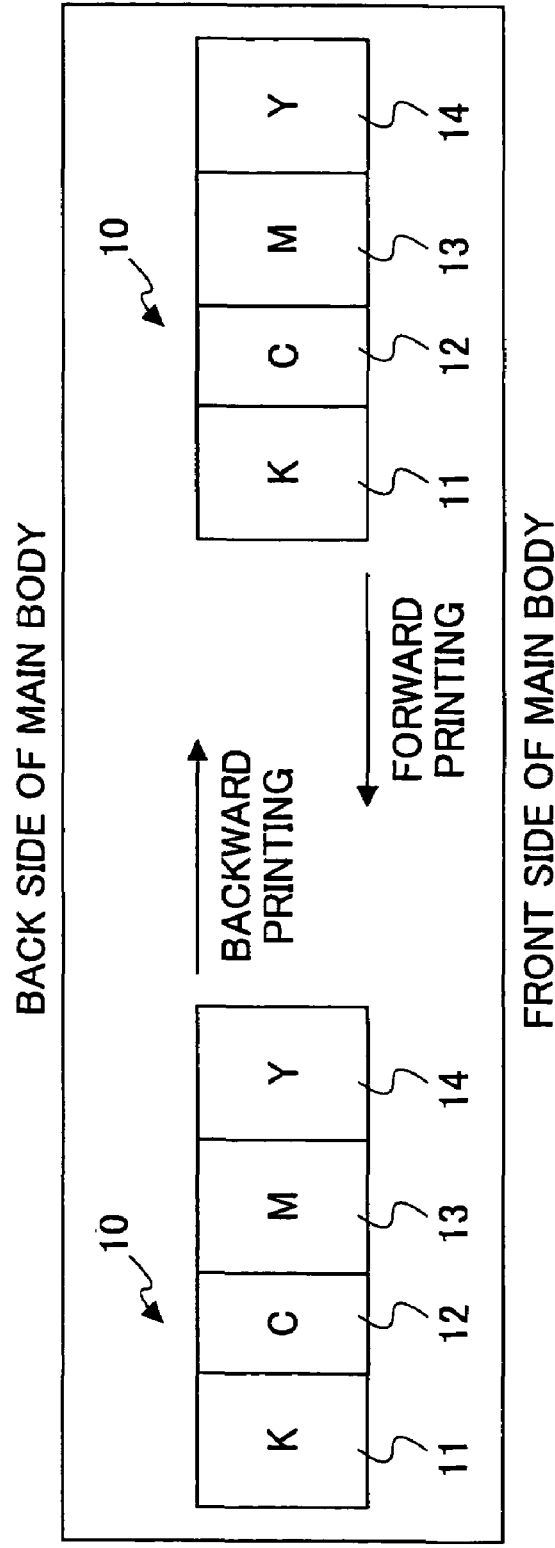
FIG. 13 shows an example of the order of colors arranged in the head unit, and shows a dominating color and a dominated color.

FIG. 13 shows an example of the color order in the printing head and dominating/dominated colors in the bi-directional printing. In FIG. 13, when two colors out of shown four colors are printed at the same position on the print paper 15, the dominating color and the dominated color are shown. When the forward printing is switched to the backward printing, the dominating/dominated color relation is reversed. A dominating degree and a dominated degree of the colors change, depending on a type of print paper and the composition of inks. Predicted dominating/dominated color relations at the time of the forward printing and at the time of the backward printing are described in the following equations 2 and 3 that are a simplified relation for a simple description.

The predicted color dominating/dominated relation at the time of the forward printing (equation 2): K>C>M>Y.

The predicted color dominating/dominated relation at the time of the backward printing (equation 3): Y>M>C>K.

Figure 14:
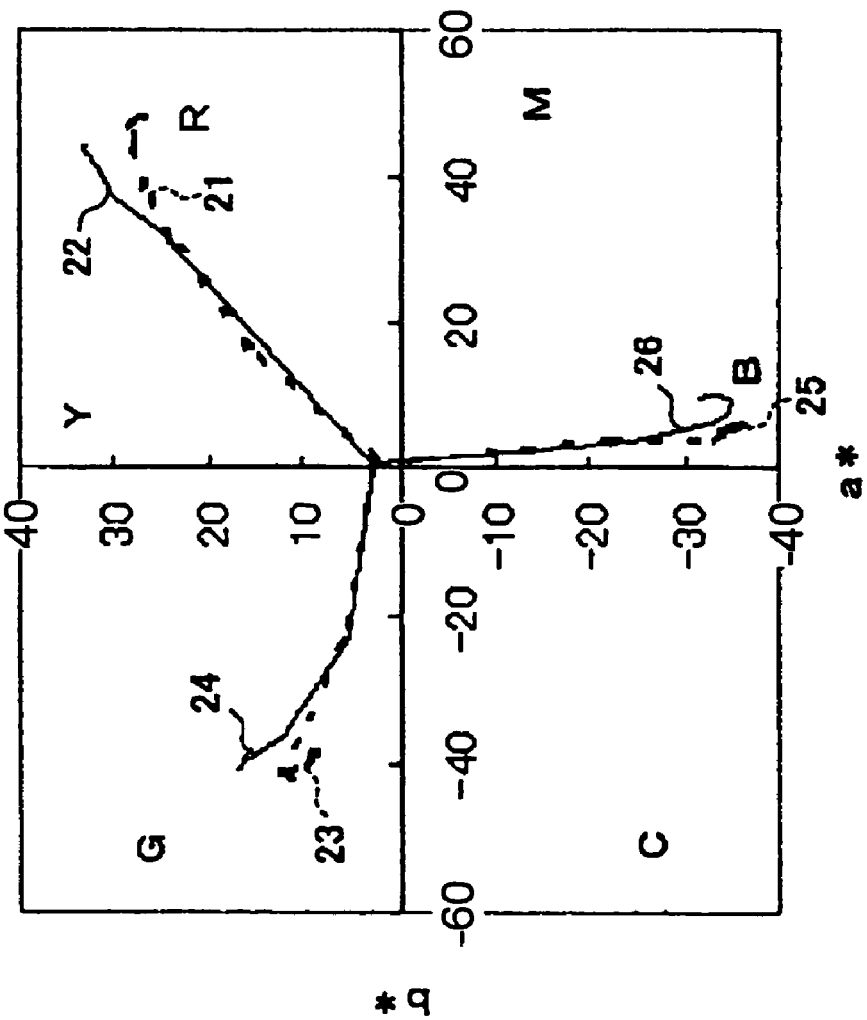
FIG. 14 is a chromaticity diagram showing one example of a color tone change caused by the bi-directional printing.

FIG. 14 is a chromaticity diagram showing one example of the color difference caused by the bidirectional printing. The reference numbers 21, 22, 23, 24, 25, and 26 designate characteristics curves showing the colors or the hues, respectively. The characteristics curve 21 shows red R printed by the forward printing, the characteristics curve 22 shows red R printed by the backward printing, the characteristics curve 23 shows green G printed by the forward printing, the characteristics curve 24 shows green G printed by the backward printing, the characteristics curve 25 shows blue B printed by the forward printing, and the characteristics curve 26 shows blue B printed by the backward printing. According to the equations 2 and 3, the color dominating/dominated relation (the characteristics curve 21) of red R is reversed to become the color dominating/dominated relation (the characteristics curve 22) when the forward printing is switched to the backward printing. When the backward printing is performed (the characteristics curve 22), red R inclined to the yellow side is generated. As for green G, when the backward printing is performed (the characteristics curve 24), green G inclined to the yellow side is generated. As for blue B, when the backward printing is performed (the characteristics curve 26), blue B inclined to the magenta side is generated.

Figure 15:
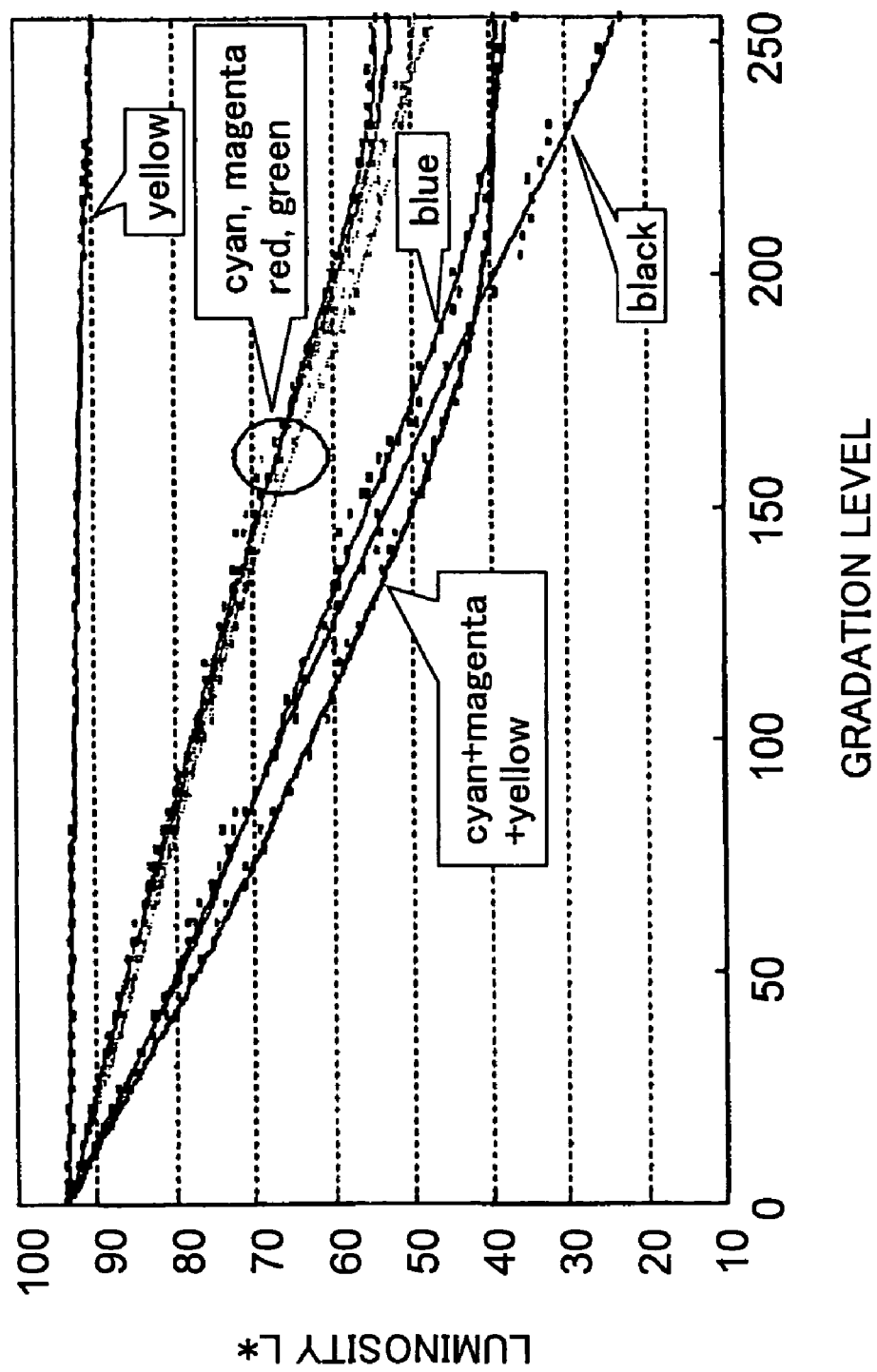
FIG. 15 is a graph showing a range of a reproduced luminosity of each color.

FIG. 15 is one example of a graph showing a luminosity reproduction range of each color. In this example, particularly, in the case of red and green, at the time of the bi-directional printing, not only the hue difference occurs, but also the luminosity becomes high when the red and green are inclined to the yellow side. In the case of blue, since difference in the luminosity between cyan itself and magenta itself that are mixed for generating blue is small, the change of the color (the hue or the chromaticity) is small when the color dominating/dominated relation is reversed. Accordingly, the luminosity difference in the case of blue between the forward printing and the backward printing is not recognized to the degree in the case of red and green. Such a tendency is determined by the arranged order of the colors. In the arranged order shown in FIG. 13, color inks is printed in the order of K, C, M, and Y in the forward printing. However, this tendency or color difference can change if the arranged order in the printing head unit is the order of K, Y, M, and C toward the forward direction (yellow and cyan are replaced with each other compared with the case of FIG. 13).

In the second embodiment, in the bi-directional printing, the gamma correction parameters may be switched at the time of the backward printing to the gamma correction parameters used for the backward printing that are different from the gamma correction parameters used for the forward printing, in order to suppress the change (the difference) of the color (the hue or the chromaticity) generated in the bi-directional printing. Of course, in the bi-directional printing, the gamma correction parameters may be switched at the time of the forward printing to the gamma correction parameters used for forward printing that are different from the gamma correction parameters used for the backward printing. By the gamma correction parameter switching, the color difference can be suppressed. It is desired that the gamma correction parameters should be adjusted when a plurality of color inks such as two or three color inks are printed at the same position on the print paper 15. On the other hand, since the color difference in the forward printing and the backward printing should not be generated regarding a single color ink that is printed at a position on the print paper 15 at which another ink is not printed, it is undesirable that the gamma correction parameter is adjusted for this single color ink to be printed at a position where the other color inks are not printed (hereinbelow, such a single color ink is referred to as the single color ink or the single color printing). In other words, the gamma correction processing is performed in order to suppress the color difference generated when the bi-directional printing is performed, and the gamma correction processing should not generate another color difference in the bi-directional printing, for example, regarding such a single color ink.

However, when the gamma correction parameters are switched, it is unavoidable to affect single color ink printing due to the gamma correction parameter switching. This is because when the color difference in the single color ink between the forward printing and the backward printing is minimized, the correction effect of the color difference for the two or three color inks to be printed at the same position is reduced. According to this embodiment, as one method, by changing only the gamma correction parameter of yellow, the correction for the color difference is performed on the two or three color inks to be printed at the same position or region on the print paper 15 such that the color difference in the single color ink between the forward printing and the backward printing can be also minimized.

In the case where the color inks are arranged in the head unit in the order of K, C, M, and Y as shown in FIG. 13, Yellow positioned at one end in the order is always dominated by the other one or two or more colors when yellow and the other one or more colors are printed at the same position in the forward printing. In this case, yellow always dominates the other one or two or more colors when yellow and the other one or more colors are printed at the same position in the backward printing. As understood from FIG. 14, yellow is always emphasized when two color inks including yellow ink are printed at the same position in the backward printing. In other words, contribution to the hue by yellow ink always becomes reduced in the forward printing. Accordingly, yellow may be suppressed at the time of the backward printing in order to reduce the color difference of yellow between the forward printing and the backward printing.

Figure 16:
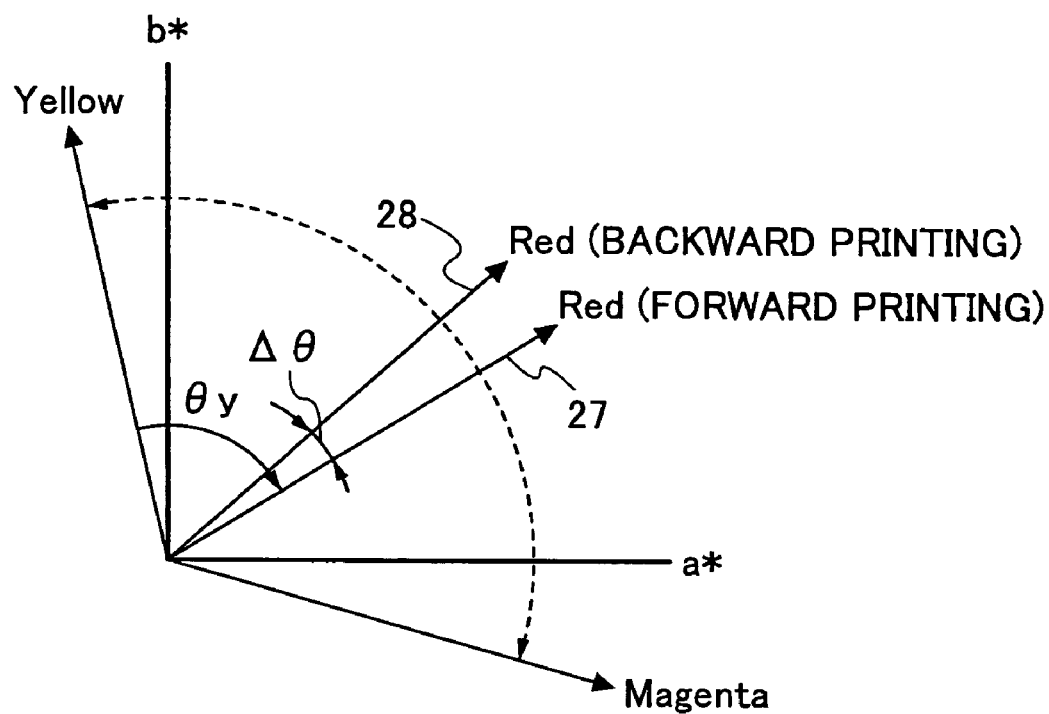
FIG. 16 is a chromaticity diagram showing a method for calculating a correction amount used to correct the color difference, based on an angle difference on the chromaticity diagram.

FIG. 16 shows one example of a method for calculating a correction amount used for suppressing the color difference caused by the bi-directional printing. This calculation of the correction amount is based on the angle difference on the chromaticity diagram. In FIG. 16, the reference number 27 designates an angle of red in the case of the forward printing, and the reference number 28 designates an angle of red in the case of the backward printing. As described above, the forward printing is assumed to be the standard, and it is determined how different the color obtained in the backward printing is from the color obtained in the forward printing. An amount of yellow ink used in the backward printing is corrected in accordance with this determination. This correction is performed such that the corrected amount of yellow ink in the backward printing corresponds to the emphasized contribution to the hue by yellow caused when the yellow dominated by the other colors in the forward printing is changed to be dominating the other colors in the backward printing.

Meanwhile, the correction method such as a middle tone process and the CMM may be used as another method for suppressing the difference in the color. However, in these methods, it is difficult to create correction parameters, and there is a possibility that a by-product such as moire is generated. On the other hand, it is easy to create the gamma correction parameters, and in the case of using the gamma correction parameters, if the created parameters differ from the correct values, the amount of the difference between the created parameters and the correct values, the tendency of this difference, and the like can be easily determined from the printed color state. For this reason, in the second embodiment of the present invention, the gamma correction parameters are used.

In FIG. 16, the angle $\Delta\theta$ indicates the difference between the hue obtained in the backward printing and the hue obtained in the forward printing. In this case, the gamma correction parameter (in this example, the gamma correction parameter of yellow) used for the forward printing is multiplied by the correction coefficient $\beta$ to create the gamma correction parameter (in this example, the gamma correction parameter of yellow) used for the backward printing so as to correct the hue difference caused by the bi-directional printing. The correction coefficient $\beta$ is obtained by the equation 4: $\beta=1-\alpha\times\Delta\theta/\theta y$ ($\alpha\geq 1$). In the equation 4, $\alpha$ is a real number that is equal to or larger than 1, but $\alpha$ needs to be adjusted to obtain the gamma correction parameter corresponding to the target correction amount of the hue difference by taking into account the properties of the inks and the paper, an amount of the ejected ink drop, and/or the flying speed of the inks.

According to the second embodiment of the present invention, only one color positioned at the one end of the head unit may be corrected in order to suppress the color difference between the forward printing and the backward printing. In this manner, it is possible to make the correction effects of the other colors uniform in terms of the correction in which the color or the hue generated by the other colors is corrected by the effect of the corrected one color positioned at the one end of the printing head unit. In addition to that, by correcting only yellow in accordance with the forward printing and the backward printing, when performing the correction process for correcting the color difference generated in the bi-directional printing, it is difficult for human eyes to recognize the difference in yellow between the forward printing and the backward printing. In other words, while the difference in the color in the bi-directional printing can be prevented, it is possible to avoid the reduction in the print quality caused by the difference in the single color between the forward printing and the backward printing when only the single color (in this example, yellow) is printed. Furthermore, since the difference in the color in the bi-directional printing is suppressed by only multiplying the gamma correction parameter by the correction coefficient corresponding to an amount of the difference in the color (the hue or the chromaticity) caused by the bi-directional printing, it is possible to easily create and adjust the parameter.

In the example shown in FIG. 16, the difference in the hue angle is constant over the entire range of the color saturation or the chroma. However, in reality, when the difference in the color caused by the bi-directional printing needs to be corrected, there are many cases where the distribution of the hue angle is distorted over the range of the color saturation. For example, as shown in the chromaticity diagram of FIG. 14, there is almost no difference in the hue in the range of the low color saturation, but there is a case where the difference in the hue between the forward printing and the backward printing rapidly increases from the middle value to a higher value of the color saturation. This hue difference that rapidly increases from the middle value of the color saturation is caused by the many-valued process (or the few-valued process), and the difference in the color becomes large when the dot size is switched. Further, the shape of the distribution of the hue angle is also affected by the density limitation point (the print density that can be printed on the paper) determined by the characteristics of the ink and paper, the settings of the screen angles of the respective colors, phase shifting, and the like. In such a case, the method in which the gamma correction parameter is simply multiplied by the correction coefficient $\beta$ is not adequate for correcting the difference in the color caused by the bi-directional printing.

Figure 17:
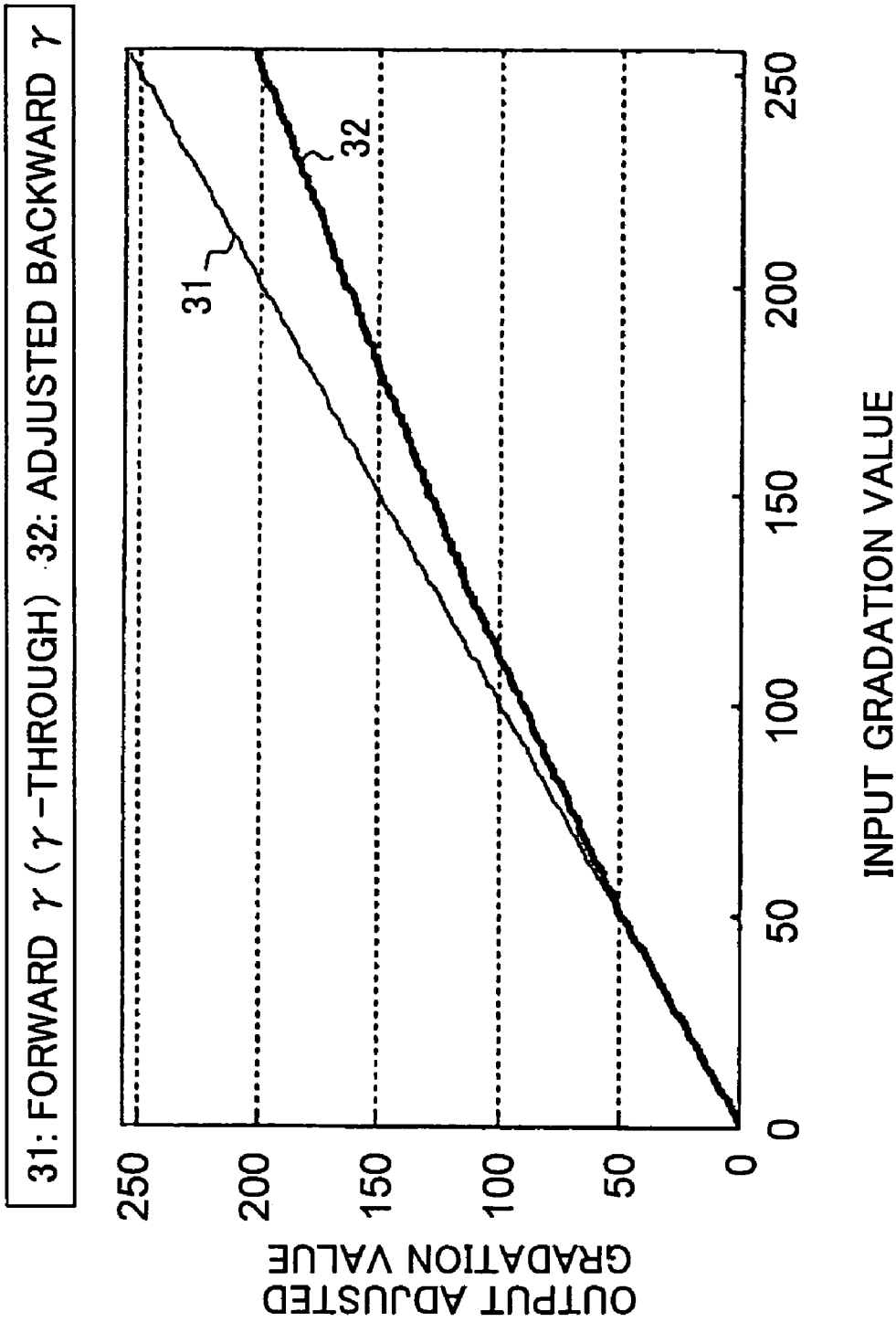
FIG. 17 shows one example of a gamma for the forward printing and a gamma for the backward printing.

FIG. 17 shows one example of the gamma for the forward printing and the gamma for the backward printing. In this example, a gamma 31 that is referred to as a gamma-through functions such that a ratio of an input gradation to an output gradation becomes 1 to 1 as shown in FIG. 17. In other words, the gamma 31 is an unadjusted gamma. This gamma-through is applied to create the gamma correction parameter for the forward printing, and a value of an adjusted gamma 32 for the backward printing is determined by using this gamma-through as a measure so as to minimize the color difference between the forward printing and the backward printing. The gamma correction parameter for the forward printing is multiplied by the adjusted ratio (i.e., the adjusted gamma 32) so as to create the gamma correction parameter used for the backward printing.

According to the second embodiment of the present invention, the gamma correction parameter for the backward printing that is used for making the color obtained by the backward printing the same as the color obtained by the forward printing can be created for the inkjet printing apparatus that generates the variable color difference caused by the gradation processing method or a relation between the ink and the paper.

In the above-described example, yellow represents the color whose gamma correction parameter is adjusted because the description is made based on the arranged color order shown in FIG. 13 where yellow is positioned at the end facing the backward printing direction. For example, if cyan is arranged at the end facing the backward printing direction, the same manner described above may be applied in order to prevent cyan ink from strongly generating its color in the backward printing.

However, preferably, yellow is arranged in the head unit so as to be positioned at the one end facing the backward direction or the forward printing direction, and the gamma parameter of yellow used for the backward printing is adjusted so as to minimize the color difference generated between the forward printing and the backward printing. As described in the following, this is because the color difference of the yellow between the forward printing and the backward printing can be minimized compared with other colors.

Figure 18:
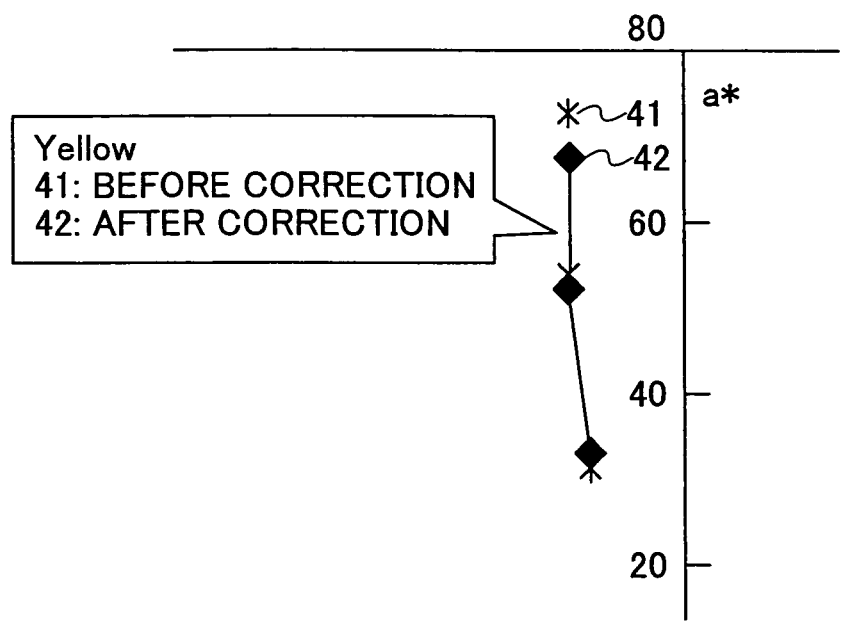
FIG. 18 is an enlarged view of the chromaticity diagram, and shows one example of a difference between chromaticity of yellow before the color difference correction and the chromaticity of yellow after the color difference correction.

FIG. 18 is a partial enlarged view of the chromaticity diagram showing the chromaticity shift of yellow between the chromaticity before color difference correction and the chromaticity after the color difference correction. In FIG. 18, the reference number 41 designates data before the correction, and the reference number 42 designates data after the correction. The varying range of the luminosity of yellow is extremely narrow compared with other single colors, and if the yellow is adjusted, human eyes almost cannot recognize the difference of the luminosity of yellow. Therefore, yellow is selected as the color to be adjusted. The single color (not limited to yellow) whose gamma parameter is reduced for the backward printing correction is printed with the luminosity higher than the luminosity generated when this single color is printed in the forward printing. As shown in FIG. 18, when only the single color is printed at certain positions in the bidirectional printing, since the other colors are not mixed with this single color, distribution of the hue is not changed, but the difference of the luminosity of the single color is generated between the forward printing and the backward printing. An amount of the difference in the luminosity of yellow between the forward printing and the backward printing when the gamma correction parameter of yellow is adjusted is much smaller than an amount of the difference in the luminosity of cyan or magenta between the forward printing and the backward printing when the gamma correction parameter of cyan or magenta is adjusted at the same adjustment ratio as that of the gamma correction parameter of yellow. The result of this comparison of the luminosity when the gamma parameters of cyan, magenta, and yellow are adjusted to be the same value of 80% is shown as follows. The reproduced luminosity range of cyan is 47 to 94. The reproduced luminosity range of magenta is 53 to 94. The reproduced luminosity range of yellow is 89 to 94. If the width ΔL of the reproduced luminosity range of yellow is 1, ΔL of cyan is 9.4, and ΔL of magenta is 8.2.

In the second embodiment of the present invention, as for the chromaticity difference of blue that is produced by the combination of cyan and magenta, the adjustment of the gamma correction parameter of cyan and/or magenta is only the method for suppressing the chromaticity difference of the single color of cyan or magenta between the forward printing and the backward printing, that is, only the method for making it difficult for human eyes to recognize the chromaticity difference. As a result, a priority is given to either the quality of the single color obtained when only the single color is printed at certain positions on the paper, or the quality of the combination of two colors obtained when the two colors are printed at the same position. However, as for cyan and magenta, there is not much difference in the reproduced luminosity range between cyan and magenta, so that when the dominated color is changed to be the dominating color, and the dominating color is changed to be the dominated color, the difference in the luminosity is not generated, and only the difference in the hue is generated. Therefore, the difference in the color of blue between the forward printing and the backward printing is adequately smaller than that of red or green, and even if this difference in the color of blue is not corrected, the image quality is not greatly reduced.

The above description is made by adopting as the representative example the inkjet printing apparatus that ejects liquid ink. However, the present invention may be applied to printing means that generate the color difference between the forward printing and the backward printing caused by the changing of the order of colors to be printed on top of one another. For example, the present invention may be applied to a printing apparatus that uses a toner-jet method, a thermal method, or the like.

Furthermore, the application of the present invention is not limited to the inkjet printing apparatus, but the present invention may be applied to a printing apparatus in which the order of colors to be printed on top of one another is changed during the printing sequence, and the difference in the chromaticity is generated by this color order change. Also in this-case, the improvement of the quality of the image or the like that is the same as the improvement described above can be realized.

Figure 19:
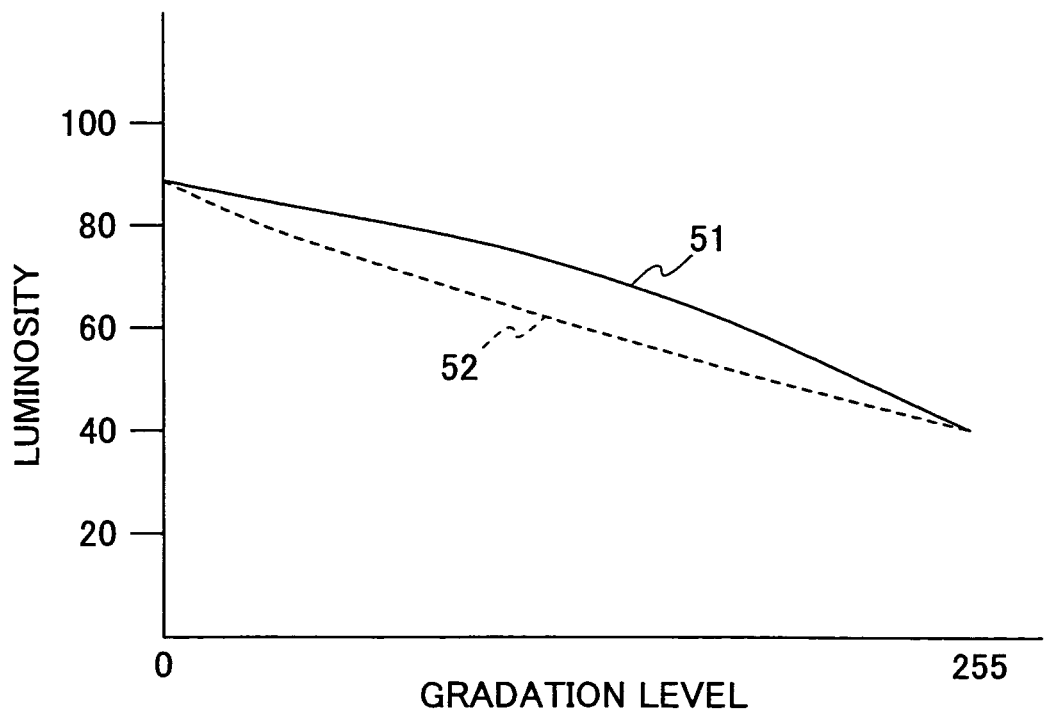
FIG. 19 shows one example of measured luminosities produced by the forward printing and measured luminosities produced by the backward printing.

FIG. 19 shows the measured luminosities that are reproduced by the forward printing and the backward printing according to another example in the second embodiment. In FIG. 19, the reference number 51 designates a luminosity reproduced curve corresponding to the backward printing, and the reference number 52 designates a luminosity reproduced curve corresponding to the forward printing. As in this example, the gamma correction parameter used for the backward printing may be created such that the difference in the luminosity between the forward printing and the backward printing becomes minimized.

Figure 20:
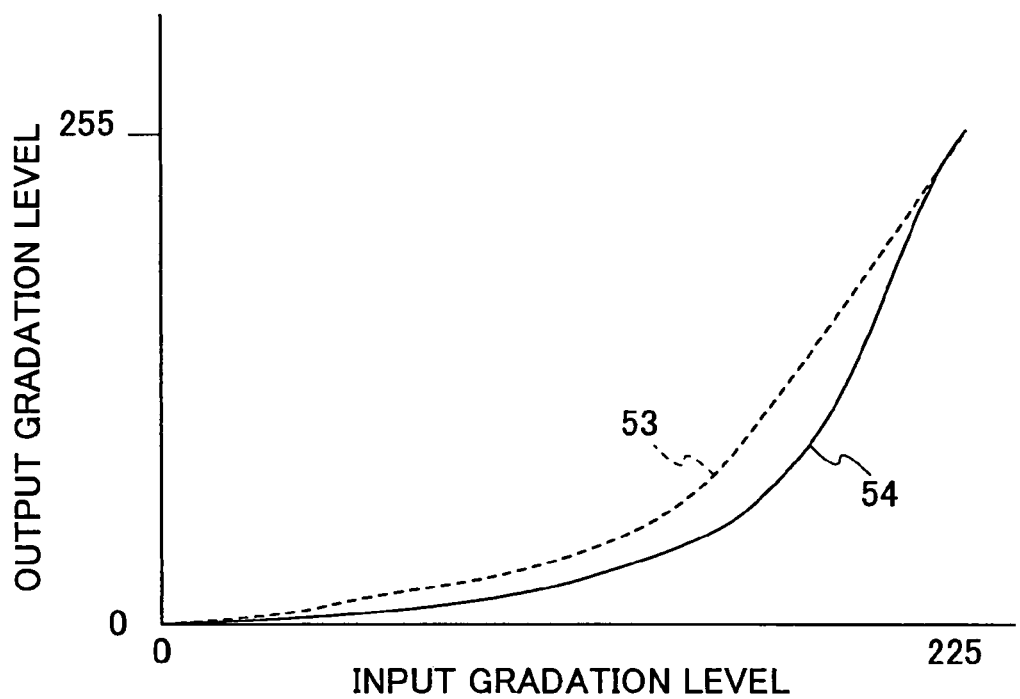
FIG. 20 shows gamma correction parameters that are created based on luminosity reproduced curves of FIG. 19.

FIG. 20 shows one example of the gamma correction parameters that are created based on the luminosity reproduced curves shown in FIG. 19. The reference number 53 designate the gamma correction parameter that is created based on the luminosity reproduced curve 52 of FIG. 19, and the reference number 54 designates the gamma correction parameter that is created based on the luminosity reproduced curve 51. That is, the gamma correction parameter 53 is used for the forward printing, and the gamma correction parameter 54 is used for the backward printing.

Figure 21:
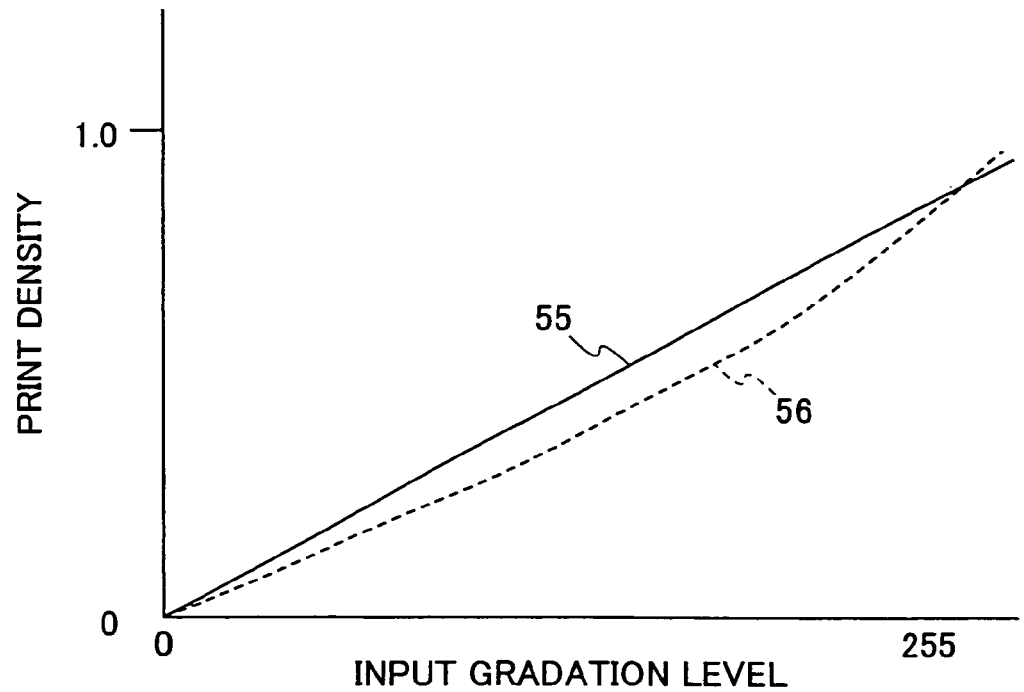
FIG. 21 shows measured ink densities produced by the forward printing and measured ink densities produced by the backward printing in another example of the second embodiment.

FIG. 21 shows one example of the measured print density produced by the forward printing, and the measured print density produced by the backward printing. In FIG. 21, the reference number 55 designates a print density reproduced curve corresponding to the backward printing, and the reference number 56 designates a print density reproduced curve corresponding to the forward printing. As in this example, the gamma correction parameter used for the backward printing may be created so as to minimize the difference in the print density between the forward printing and the backward printing. The thus-created gamma correction parameter for the backward printing may be stored together with the gamma correction parameter for the forward printing in storing means such as a hard disk of a personal computer or the like, and the switching of the gamma correction parameter may be performed in accordance with the forward printing or the backward printing.

According to the second embodiment of the present invention, the gamma correction parameters used for correcting the chromaticity based on the luminosity difference and/or the print density difference caused by the bi-directional printing may be stored in the storing means, and the gamma parameter switching may be carried out in accordance with the forward or backward printing. In this manner, it is possible to not only simplify the correction process but also reduce a development workload related to the gamma correction because the gamma correction parameter can be easily created and adjusted. Therefore, a user who does not have a special tool or device can easily adjust the gamma correction parameter.

Figure 22:
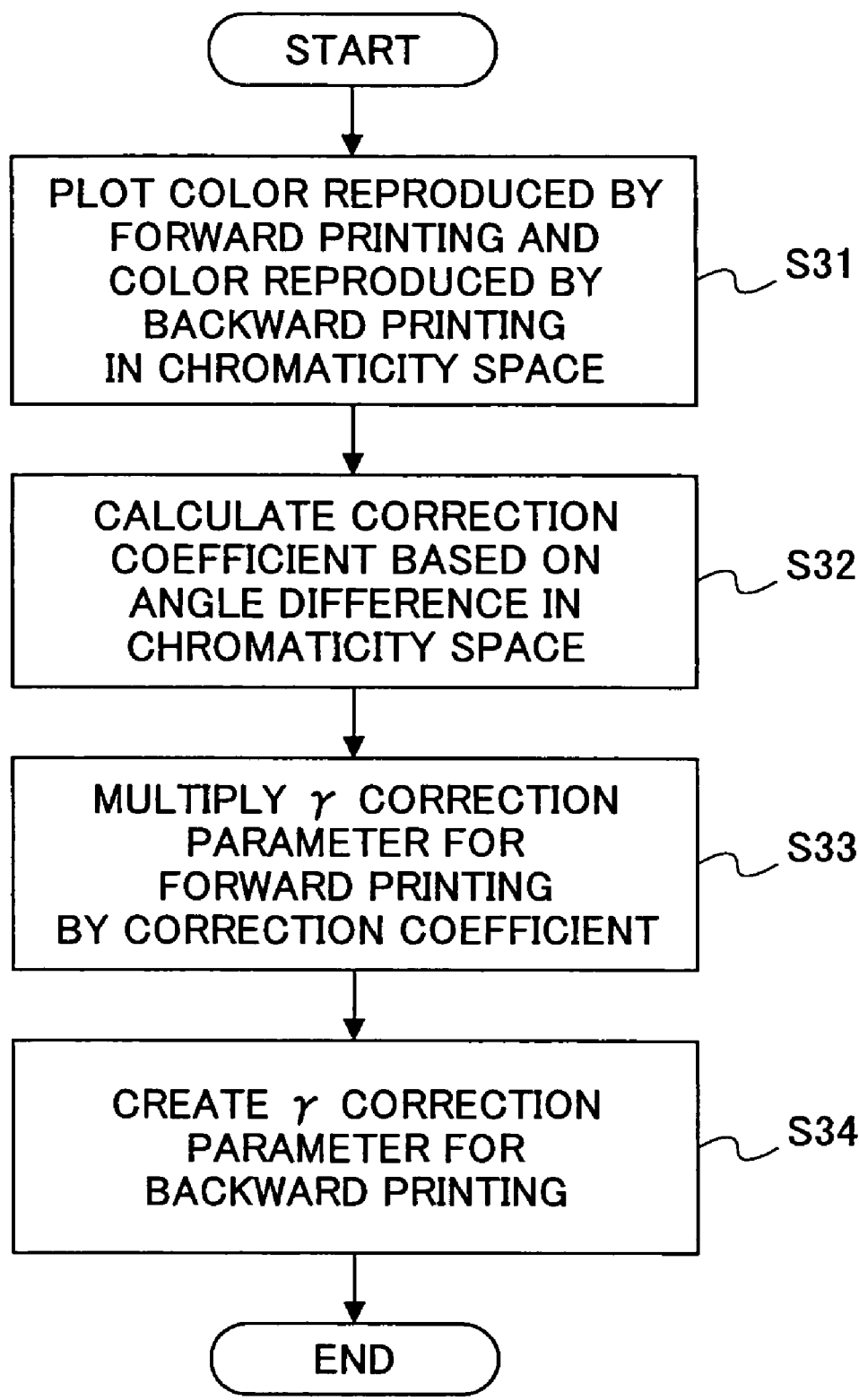
FIG. 22 is a flow chart showing one example of a method for creating a correction parameter according to the second embodiment of the present invention.

FIG. 22 is a flow chart showing one example of a method (the above-described method) of creating the gamma correction parameter according to the second embodiment of the present invention. First, at step S31, a color reproduced in the forward printing by the inkjet printing apparatus, and a color reproduced in the backward printing by the inkjet printing apparatus are plotted in a chromaticity space. At step S32, the correction coefficient is calculated based on the angle made by a first line and a second line in the chromaticity space. The first line is drawn on both the plotted color point (or the chromaticity point) of the forward printing and the origin of the coordinate axes of the chromaticity space, and the second line is drawn on both the color point of the backward printing and the origin of the coordinate axes of the chromaticity space.

Next, at step S33 the gamma correction parameter for the forward printing is multiplied by the calculated correction coefficient so as to create the gamma correction parameter for the backward printing at step S34. At the time of performing the backward printing, the inkjet printing apparatus switches the gamma correction parameter for the forward printing to the gamma correction parameter created at step S34.

Figure 23:
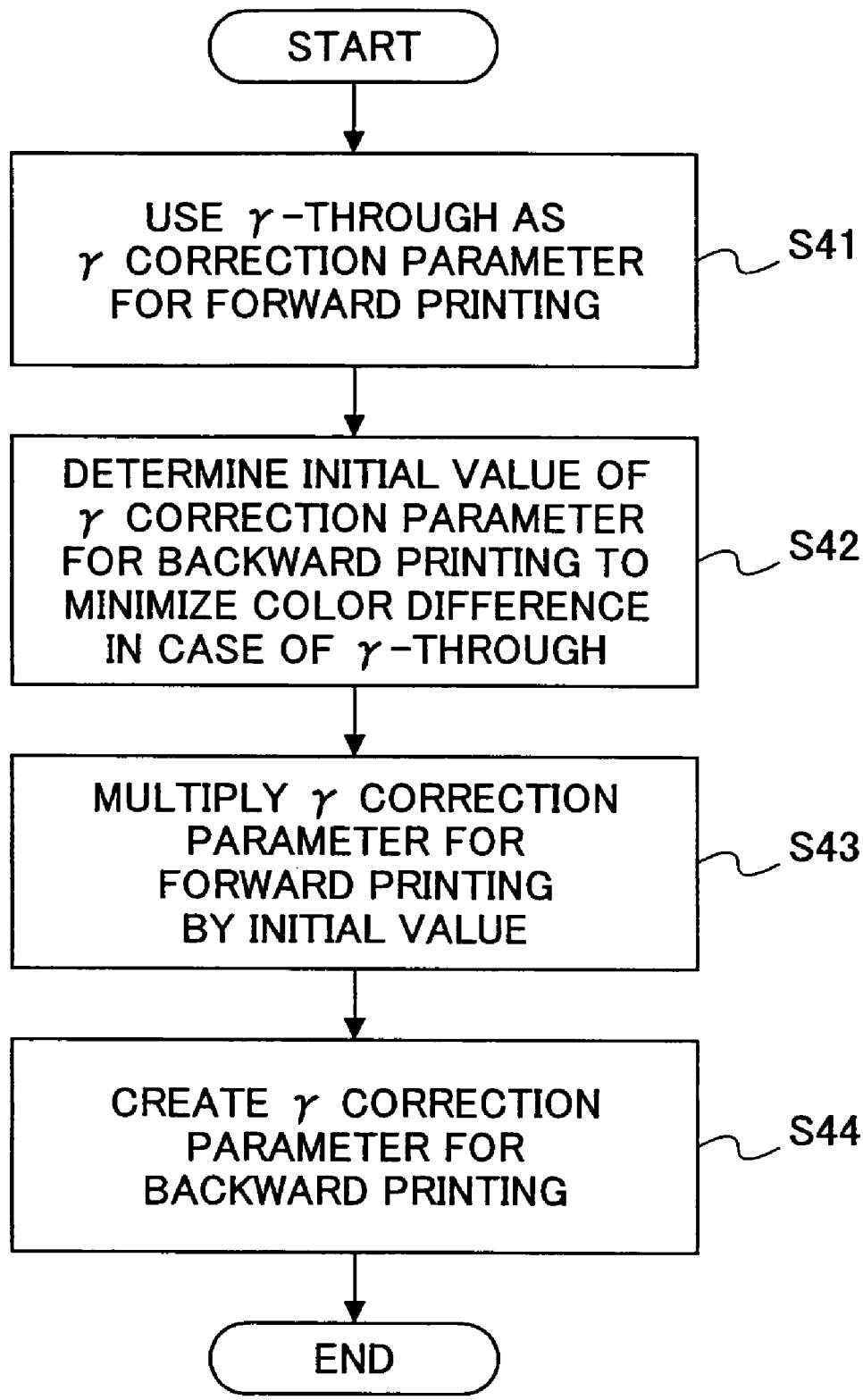
FIG. 23 is a flow chart showing another example of a method for creating a gamma correction parameter according to the second embodiment of the present invention.

FIG. 23 is a flow chart showing another example of a method (the above-described method) for creating the gamma correction parameter according to the second embodiment of the present invention. First, at step S41, the gamma-through by which the ratio of the input gradation to the output gradation becomes 1 to 1 is applied to create the gamma correction parameter for the forward printing. At step S42, an initial value of the gamma correction parameter for the backward printing is determined by using this applied gamma-through as a measure such that the chromaticity difference between the forward printing and the backward printing is made to be minimized. At step S43, the gamma correction parameter for the forward printing is multiplied by the initial value of the gamma correction parameter for the backward printing determined at step 42 so as to create the gamma correction parameter for the backward printing at step S44. At the time of performing the backward printing, the inkjet printing apparatus switches the gamma correction parameter used in the forward printing to the gamma correction parameter created at step S44.

The steps of the color difference correction method, the functions of the inkjet printing apparatus, and so on related to the bi-directional printing are described in the above-described embodiments. However, the present invention is not limited to these embodiments, and a program that instructs a computer to perform the processing for correcting the color difference caused by the bi-directional printing may be made. This program may include a printer driver that can be incorporated in the computer. Furthermore, a computer readable storing medium that stores this program may be made.

Examples of the storing medium that stores the program and/or data for performing the method of correcting the color difference caused by the bi-directional printing will be described according to the present invention. A CD-ROM, a magnetic optical disk, a DVD-ROM, a floppy disk, a flash memory, a memory card, a memory stick, and other ROMs and RAMs may be used as this storing medium. The program that is executed by a computer so as to perform the steps of the method for correcting the color difference caused by the bi-directional printing according to the above-described embodiments may be stored in this storing medium, and this storing medium is made to be in circulation for actual use so as to easily realize this color correction method. Such a storing medium may be installed on an information processing device such as the computer, and the program of the storing medium may be read by the information processing device. Alternatively, this program may be stored in the storing medium incorporated in the information processing apparatus, and the information processing apparatus may read this program in accordance with an operation necessity. In these manners, the method or function for correcting the color difference caused by the bi-directional printing can be performed.

According to the second embodiment of the present invention, even in the bi-directional printing mode that gives a priority to the printing speed, it is possible to prevent the color difference from being generated without causing the throughput reduction and a high cost of the apparatus or the like. Furthermore, it is possible to minimize the color difference between the forward printing and the backward printing by switching the gamma correction parameter to and from the gamma correction parameter for the forward printing or the gamma correction parameter for the backward printing.

This patent application is based on Japanese priority patent application Nos. 2002-077142 and 2002-267930 filed on Mar. 19, 2002 and Sep. 13, 2002, respectively, the entire contents of which are hereby. incorporated by reference.

The invention claimed is:

1. An image forming apparatus including a printing head that performs forward printing with inkjet color inks in a forward direction and backward printing with the inkjet color inks in a backward direction, comprising
    a gamma correction unit that uses a first gamma correction value for forward-printing image data and a second gamma correction value for backward-printing image data to reduce a color difference between the forward printing and the backward printing that is caused by a difference of printing order of the color inks between the forward printing and the backward printing,
    wherein the gamma correction unit is provided to use the non-adjusted first and second gamma correction values when a single inkjet color ink is printed on a first position on a printing medium with another inkjet color ink being not printed at the first position, and the gamma correction unit is provided to use the adjusted first gamma correction value or the adjusted second gamma correction value when two or more inkjet color inks are printed on one another at a second position on a printing medium.

2. The image forming apparatus according to claim 1, wherein only the second gamma correction value is adjusted.

3. A method for forming an image by using inkjet color inks in which forward printing is performed by moving a printing head forwards, and backward printing is performed by moving the printing head backwards, comprising the step of
    using a first gamma correction value for forward-printing image data and a second gamma correction value for backward-printing image data to reduce a color difference between the forward printing and the backward printing that is caused by a difference of printing order of the color inks between the forward printing and the backward printings wherein the non-adjusted first and second gamma correction values are used when a single inkjet color ink is printed on a first position on a printing medium with another inkjet color ink being not printed at the first position, and the adjusted first gamma correction value or the adjusted second gamma correction value is used when two or more inkjet color inks are printed on one another on a printing medium.

4. The method according to claim 3, further comprising the step of:
adjusting the second gamma correction value only.

5. A method for correcting a color difference between forward printing and backward printing performed by a printing apparatus, comprising the steps of:
creating a first gamma correction parameter for forward-printing image data and a second gamma correction parameter for backward-printing image data so as to minimize the color difference between the forward printing and the backward printing, and
performing gamma correction parameter switching so as to select one of the first gamma correction parameter and the second gamma correction parameter in accordance with the forward printing and the backward printing,
wherein the non-adjusted first and second gamma correction parameters are used when a single inkjet color ink is printed on a first position on a printing medium with another inkjet color ink being not printed at the first position, and the adjusted first gamma correction parameter or the adjusted second gamma correction parameter is used when two or more inkjet color inks are printed on one another on a printing medium.

6. The method according to claim 5, wherein the forward printing and the backward printing are performed by the printing apparatus having a head unit that ejects liquid ink on paper to print an image on the paper.

7. The method according to claim 6, wherein the liquid ink is pigment type ink.

8. The method according to claim 5, wherein the first gamma correction parameter and the second gamma correction parameter that are switched to each other in accordance with the forward printing and the backward printing correspond to a first color positioned at an end of order of colors arranged in the head unit, the first color being last printed out of the colors in the forward printing, and the first color being first printed out of the colors in the backward printing.

9. The method according to claim 5 or 8, wherein the first and second gamma correction parameters that are switched to each other in accordance with the forward printing and the backward printing correspond to a yellow color.

10. The method according to claim 5, wherein the first gamma correction parameter is created based on the second gamma correction parameter, or the second gamma correction parameter is created based on the first gamma correction parameter.

11. The method according to claim 10, further comprising the steps of:
plotting, in a color space, a first color reproduced by the forward printing, and a second color reproduced by the backward printing, the first color corresponding to the second color;
calculating a correction coefficient based on a difference in an angle made by a first line and a second line in the color space, wherein the first line is drawn on a point of the first color in the color space and an origin of coordinate axes of the color space, and the second line is drawn on a point of the second color in the color space and the origin of the coordinate axes of the color space; and
multiplying the first gamma correction parameter for the forward printing by the calculated correction coefficient so as to create the second gamma correction parameter.

12. The method according to claim 10, further comprising the steps of:
applying a gamma-through to create the first gamma correction parameter, wherein the gamma-through makes a gradation ratio of input image data to output image data 1 to 1;
determining an initial value of the second gamma correction parameter by using the gamma-through as a measure so as to minimize a color difference between the forward printing and the backward printing; and
multiplying, by the determined initial value of the second gamma correction parameter, the first gamma correction parameter so as to create the second gamma correction parameter.

13. The method according to claim 10, further comprising the steps of:
applying a gamma-through to create the first gamma correction parameter, wherein the gamma-through makes a gradation ratio of input image data to output image data 1 to 1;
determining an initial value of the second gamma correction parameter by using the gamma-through as a measure so as to minimize a difference in a print density or a luminosity between the forward printing and the backward printing; and
multiplying, by the determined initial value of the second gamma correction parameter, the first gamma correction parameter so as to create the second gamma correction parameter.

14. A printing apparatus that performs forwarding printing and backward printing, comprising:
a head unit for printing an image;
storing means for storing a first gamma correction parameter for forward-printing image data and a second gamma correction parameter for backward-printing image data so as to minimize a color difference between the forward printing and the backward printing; and
correction mean for performing gamma correction parameter switching so as to select one of the first gamma correction parameter and the second gamma correction parameter in accordance with the forward printing and the backward printing,
wherein the correction means is provided to use the non-adjusted first and second gamma correction parameters when a single inkjet color ink is printed on a first position on a printing medium with another inkjet color ink being not printed at the first position, and the correction means is provided to use the adjusted first gamma correction parameter or the adjusted second gamma correction parameter when two or more inkjet color inks are printed on one another at a second position on a printing medium.

15. The printing apparatus according to claim 14, wherein the head unit ejects liquid ink on paper so as to print an image on the paper.

16. The printing apparatus according to claim 15, wherein the liquid ink is pigment type ink.

17. The printing apparatus according to claim 14, wherein the first gamma correction parameter and the second gamma correction parameter that are switched to each other in accordance with the forward printing and the backward printing correspond to a first color positioned at an end of order of colors arranged in the head unit, the first color being last printed out of the colors in the forward printing, and the first color being first printed out of the colors in the backward printing.

18. The printing apparatus according to claim 14 or 17, wherein the first and second gamma correction parameters that are switched to each other in accordance with the forward printing and the backward printing correspond to a yellow color.

19. The printing apparatus according to claim 14, wherein the first gamma correction parameter is created based on the second gamma correction parameter, or the second gamma correction parameter is created based on the first gamma correction parameter.

20. The printing apparatus according to claim 19, wherein the second gamma correction parameter is created by multiplying the first gamma correction parameter by a correction coefficient, the correction coefficient is created based on an angle made by a first line and a second line, the first line is drawn on an origin of coordinate axes of a color space and a first point in the color space, the second line is drawn on the origin of the coordinate axes of the color space and a second point in the color space, the first point corresponds to a first color reproduced by the forward printing, and the second point corresponds to a second color reproduced by the backward printing, the first color corresponding to the second color.

21. The inkjet printing apparatus according to claim 19, wherein a gamma-through that makes a gradation ratio of input image data to output image data 1 to 1 is applied to create the first gamma correction parameter, and the second gamma correction parameter is created by multiplying the first gamma correction parameter by an initial value of the second gamma correction parameter after the initial value of the second gamma correction parameter is determined by using the gamma-through as a measure so as to minimize a color difference between the forward printing and the backward printing.

22. The inkjet printing apparatus according to claim 19, wherein a gamma-through that makes a gradation ratio of input image data to output image data 1 to 1 is applied to create the first gamma correction parameter, and the second gamma correction parameter is created by multiplying the first gamma correction parameter by an initial value of the second gamma correction parameter after the initial value of the second gamma correction parameter is determined by using the gamma-through as a measure so as to minimize a difference in a luminosity or a print density between the forward printing and the backward printing.

23. A program to be executed by a computer so as to perform a method for correcting a color difference between forward printing and backward printing performed by a printing apparatus, the method comprising the steps of:

creating a first gamma correction parameter for forward-printing image data and a second gamma correction parameter for backward-printing image data so as to minimize the color difference between the forward printing and the backward printing; and performing gamma correction parameter switching so as to select one of the first gamma correction parameter and the second gamma correction parameter in accordance with the forward printing and the backward printing, wherein the non-adjusted first and second gamma correction parameters are used when a single inkjet color ink is printed on a first position on a printing medium with another inkjet color ink being not printed at the first position, and the adjusted first gamma correction parameter or the adjusted second gamma correction parameter is used when two or more inkjet color inks are printed on one another on a printing medium.

24. A program to be executed by a computer so that a printing apparatus performs forward printing and/or backward printing so as to correct a color difference between the backward printing and the forward printing, the printing apparatus comprising:

a head unit for printing an image;

storing means for storing a first gamma correction parameter for forward-printing image data, and a second gamma correction parameter for backward-printing image data so as to minimize a color difference between the forward printing and the backward printing; and correction mean for performing gamma correction parameter switching so as to select one of the first gamma correction parameter and the second gamma correction parameter in accordance with the forward printing and the backward printings wherein the correction means is provided to use the non-adjusted first and second gamma correction parameters when a single inkjet color ink is printed on a first position on a printing medium with another inkjet color ink being not printed at the first position, and the correction means is provided to use the adjusted first gamma correction parameter or the adjusted second gamma correction parameter when two or more inkjet color inks are printed on one another at a second position on a printing medium.

25. A computer-readable storing medium that stores the program of claim 23 or 24.

* * * * *